United States Patent
Kagei

(10) Patent No.: US 7,091,686 B2
(45) Date of Patent: Aug. 15, 2006

(54) ELECTRIC POWER STEERING APPARATUS

(75) Inventor: Katsunori Kagei, Aichi (JP)

(73) Assignees: Favess Co., Ltd., Okazaki (JP); Koyo Seiko Co., Ltd., Osaka (JP); Toyoda Koki Kabushiki Kaisha, Kariya (JP)

(*) Notice: Subject to any disclaimer, the term of this patent is extended or adjusted under 35 U.S.C. 154(b) by 0 days.

(21) Appl. No.: 11/122,242

(22) Filed: May 5, 2005

(65) Prior Publication Data

US 2005/0257986 A1   Nov. 24, 2005

(30) Foreign Application Priority Data

May 6, 2004   (JP)   ............... P.2004-137059
May 6, 2004   (JP)   ............... P.2004-137102

(51) Int. Cl.
*H02P 7/00*   (2006.01)
(52) U.S. Cl. ............ 318/434; 318/432; 180/412; 701/22; 701/36; 701/41; 701/42
(58) Field of Classification Search ............ 318/434, 318/432; 180/412; 701/22, 36, 41, 42
See application file for complete search history.

(56) References Cited

U.S. PATENT DOCUMENTS

| | | | |
|---|---|---|---|
| 4,977,507 A * | 12/1990 | Matsuoka et al. | 701/43 |
| 6,334,503 B1 * | 1/2002 | Fukumura et al. | 180/446 |
| 6,380,706 B1 * | 4/2002 | Kifuku et al. | 318/434 |
| 6,520,279 B1 * | 2/2003 | Fukumoto et al. | 180/446 |
| 6,705,420 B1 * | 3/2004 | Ono et al. | 180/407 |
| 6,945,351 B1 * | 9/2005 | Fujita | 180/422 |
| 2005/0242760 A1 * | 11/2005 | Fujita et al. | 318/434 |

FOREIGN PATENT DOCUMENTS

| | | |
|---|---|---|
| JP | 2586020 | 9/1998 |
| JP | 2003-284375 | 10/2003 |

* cited by examiner

*Primary Examiner*—Rita Leykin
(74) *Attorney, Agent, or Firm*—McGinn IP Law Group, PLLC

(57) ABSTRACT

The atmosphere temperature calculator calculates an estimated atmosphere temperature value by subtracting a temperature rise amount of a temperature sensor which is calculated based on a motor drive detected current value from a detected temperature value of the temperature sensor. The overheating prevention calculator calculates estimated temperature values of a plurality of protection objects to be protected from overheating based on the estimated atmosphere temperature value and the motor drive detected current value and determines an upper limit of target current of driving a motor based on such estimated temperature values. The temperature compensation calculator calculates a temperature compensation current value to be added to a target current value in order to compensate a temperature characteristic of a predetermined portion based on the estimated atmosphere temperature value.

12 Claims, 14 Drawing Sheets

(k=1, 2, ···, n)

ELECTRIC POWER STEERING APPARATUS

BACKGROUND OF THE INVENTION

The present invention relates to an electric power steering apparatus, and more specifically, to overheating prevention and temperature compensation in the electric power steering apparatus.

Generally, an electric power steering apparatus for applying a steering auxiliary force to a steering mechanism by driving an electric motor in response to a steering torque applied to a handle (steering wheel) by a driver has been used. The electric power steering apparatus is provided with a torque sensor for detecting a steering torque applied to the handle that is an operating member to steer, and a target value of a current to flow to the electric motor based on the steering torque detected by the torque sensor is set. Then, a command value to be given to a driver of the electric motor is generated based on the target value, and the voltage correspond to the command value is applied to the electric motor. The current is provided to the electric motor by applying the voltage.

In the above operation, a current flows into not only the electric motor but also the inside of an electronic control unit (ECU). As the current flows, heat is generated in the apparatus. As a result of the heat generation, the temperature of each of components constituting the apparatus gradually rises and the components may be damaged when the temperature of the components exceeds a predetermined temperature. In order to prevent the components from being damaged due to overheating, an upper limit of the value of a current for driving the motor has been set.

For example, in order to prevent the ECU from being overheated, the rise temperature of a component, such as a power transistor, etc., within the ECU is estimated and an estimated temperature of each component is calculated based on the estimated rise temperature of the component. Further, the estimated temperature of each component and the value of a current capable of being supplied to the motor may be caused to correspond to each other. The ECU is prevented from overheating by limiting the current value supplied to the motor based on the estimated temperature of each component (see, for example, Japanese Patent Publication No. 2003-284375A, and Japanese Utility Model Registration No. 2586020Y)

In a related technique, the weakest portion of an object to be protected from overheating is generally specified and protected. However, when there are various portions in which temperature rises to the highest depending on current output conditions based on steering situations, a plurality of objects should be protected from overheating. In this case, since it is required to provide a temperature sensor to each of the plurality of objects to be protected from overheating, cost increases. Further, since a temperature sensor is required to be provided in the vicinity of each object to be protected from overheating, a temperature sensor, the degree of freedom in designing a controller is lowered.

Further, a temperature sensor is required when compensating a temperature characteristic of a predetermined portion. For example, since the viscosity of grease for a reduction gear used to transmit a steering auxiliary force generated by the electric motor to a steering shaft has a temperature characteristic, a temperature sensor for detecting the temperature of a reduction gear is required for compensating the temperature characteristic.

Alternatively, overheating of the motor can also be prevented by estimating temperature rise of a mass part, a coil and a brush in the motor. In this case, the temperature rise of the mass part, the coil and the brush is estimated, and estimated temperatures of the respective portions are then calculated based on estimated rising temperatures of those portions. Further, the estimated temperatures of the respective portions correspond to a maximum value of a current which can be supplied to the motor. Also, the maximum value of a current which can be supplied to the motor is calculated by the estimated temperatures calculated for the respective portions by referring to the correspondence relationship. This limits the value of a current to be supplied to the motor and suppresses overheating of the motor.

Further, Japanese Patent Publication No. 2003-284375A discloses a motor temperature estimating device that determines whether an electric motor rotates or stops and then estimates the temperature of the motor in different calculating ways according to the determination results. The following points are described in this Publication. That is, the difference in temperature rise between a current flowing to a coil during the rotation of the electric motor and a current flowing to the coil during the stop of the electric motor is taken into consideration, so that the estimation precision of the temperature of the electric motor can be enhanced and the current can be controlled correctly.

However, in temperature estimating processing of the power steering apparatus in the related art, an error occurs between an estimated temperature and an actual temperature in devices such as a motor having, particularly, a large thermal resistance or a large capacity. These matters will be described referring to FIGS. 14 and 15. FIGS. 14 and 15 shows temperature change characteristics of a brush of a motor. FIG. 14 shows a temperature change characteristic of the brush in a case in which an input current is ON before a point of time denoted by a symbol t1 (a state in which a constant current flows) and the input current is OFF after the point of time denoted by the symbol t1 (a state in which the input current is cut off). FIG. 15 shows a temperature change of the brush in a case in which an input current is ON before the point of time denoted by the symbol t1 and after a point of time denoted by a symbol t2 and the input current is OFF during a period from the point of time denoted by the symbol t1 to the point of time denoted by the symbol t2. Here, when the temperature (actual temperature) of the brush falls down to the vicinity of the atmosphere temperature as shown in FIG. 14 after the input current is OFF, an error hardly occurs between an estimated temperature and the actual temperature even if the brush rises in temperature again. On the other hand, when the temperature of the brush does not fall down to the vicinity of the atmosphere temperature as shown in FIG. 15 until the input current is again ON after the input current is OFF, an error occurs between an estimated temperature and the actual temperature by the following reason. In this regard, in the temperature estimating processing in the related art, the estimated temperature is calculated according to a calculating formula that is defined based on actually measured data during temperature rise irrespective of whether the temperature is rising or falling. However, the temperature change characteristics of respective portions in the motor are different during temperature rise and during temperature fall. For this reason, in the temperature estimating processing in the related art, the estimated temperature when the temperature is falling cannot be obtained precisely, which causes the above-mentioned error. As a result, in controlling a current, the value of the current may be limited by a temperature different from the actual temperature, and the current may be excessively supplied to damage parts during overheating.

SUMMARY OF THE INVENTION

Accordingly, the present invention has been made to solve the above-mentioned problem, and it is an object of the present invention to provide an electric power steering apparatus capable of performing both of temperature compensation and protection from overheating by protecting a plurality of protection objects from overheating without increasing the number of temperature sensors.

Another object of the present invention is to provide an electric power steering apparatus in which, even if the temperature of a part in an apparatus rises or falls according to an operating state of an electric motor, the temperature of the part can be precisely estimated and a current can be controlled correctly, thereby preventing the part from being damaged due to overheating.

In order to solve the aforesaid object, the invention is characterized by having the following arrangement.

(1) An electric power steering apparatus for applying a steering auxiliary force to a steering mechanism of a vehicle by driving an electric motor in response to an operation to steer the vehicle, the apparatus comprising:

first and second temperature calculators that calculate respective estimated temperature values of first and second protection objects which are portions to be protected from overheating due to heat generation caused by driving the electric motor;

a temperature detector disposed in the vicinity of the first protection object;

an atmosphere temperature calculator that calculates a first temperature variation that is a temperature rise amount in the temperature detector due to the heat generation and calculates an estimated atmosphere temperature value by subtracting the first temperature variation from a detected temperature value by the temperature detector; and a current limiter that limits a current to flow to the electric motor based on the estimated temperature values of the first and second protection objects, wherein the second temperature calculator calculates a second temperature variation that is a temperature rise amount of the second protection object by the heat generation, and calculates an estimated temperature value of the second protection object based on the second temperature variation and the estimated atmosphere temperature value.

(2) The electric power steering apparatus according to (1), wherein the atmosphere temperature calculator calculates, as the first temperature variation, a temperature rise amount in the temperature detector due to the heat generation caused by the current flowing to the first protection object or its vicinity for driving the electric motor, and the second temperature calculator calculates, as the second temperature variation, a temperature rise amount of the second protection object due to the heat generation caused by the current flowing to the second protection object or its vicinity for driving the electric motor.

(3) The electric power steering apparatus according to (1), wherein the first temperature calculator calculates a temperature rise amount of the first protection object due to the heat generation and calculates an estimated temperature value of the first protection object based on the temperature rise amount of the first protection object and the detected temperature value by the temperature detector.

(4) An electric power steering apparatus for applying a steering auxiliary force to a steering mechanism of a vehicle by driving an electric motor based on a target value determined in response to an operation to steer a vehicle, the apparatus comprising:

a temperature detector disposed in the vicinity of a protection object which is a portion to be protected from overheating due to heat generation caused by driving the electric motor;

an atmosphere temperature calculator that calculates a first temperature variation that is a temperature rise amount in the temperature detector due to the heat generation and calculates an estimated atmosphere temperature value by subtracting the first temperature variation from a detected temperature value by the temperature detector;

a temperature compensation calculator that calculates a correction amount of the target value to be corrected in order to compensate a temperature characteristic of a predetermined portion based on the estimated atmosphere temperature value;

a target value corrector that corrects the target value in response to the correction amount;

a temperature calculator that calculates a second temperature variation that is a temperature rise amount of the protection object due to the heat generation and calculates an estimated temperature value of the protection object based on the second temperature variation and the estimated atmosphere temperature value or the detected temperature value; and a current limiter that limits a current to flow to the electric motor based on the estimated temperature value of the protection object.

(5) An electric power steering apparatus for applying a steering auxiliary force to a steering mechanism of a vehicle by driving an electric motor in response to an operation to steer the vehicle, the apparatus comprising:

a temperature pattern determining unit that determines whether or not a temperature of a predetermined portion where heat is generated by a current flowing to the electric motor is rising or falling; and an estimated temperature calculator that repeatedly calculates estimated temperatures of the predetermined portion so that the estimated temperatures can be obtained in time series based on a calculation result obtained by executing calculation processing according to a calculating formula having predetermined constants, wherein the estimated temperature calculator calculates the respective estimated temperatures to constitute time series based on calculation results obtained by calculation processing according to the calculating formula including the estimated temperatures which constitute the time series and are already calculated, and wherein the estimated temperature calculator switches values of the constants according to the determination result of the temperature pattern determining unit so that the values of the constants when the temperature pattern determining unit determines that the temperature of the predetermined portion is rising are different from those of the constants when the temperature pattern determining unit determines that the temperature of the predetermined portion is falling.

(6) The electric power steering apparatus according to (5), wherein the estimated temperatures of the predetermined portion are calculated based the value of a current flowing to the electric motor.

(7) The electric power steering apparatus according to (5), wherein the temperature pattern determining unit determines whether the temperature of the predetermined portion is rising or falling based the value of a current flowing to the electric motor.

(8) The electric power steering apparatus according to (5), further comprising a temperature sensor for detecting a temperature in the vicinity of the predetermined portion, wherein the temperature pattern determining unit determines whether the temperature is rising or falling based on the temperature detected by the temperature sensor.

(9) An electric power steering apparatus for applying a steering auxiliary force to a steering mechanism of a vehicle by driving an electric motor in response to an operation to steer the vehicle, the apparatus comprising:

a temperature pattern determining unit that determines whether or not the temperature of a predetermined portion where heat is generated by a current flowing to the electric motor is in a rising state or in a falling state;

a state change determining unit that determines whether the temperature of the predetermined portion has changed from the rising state to the falling state or from the falling state to the rising state according to the determination result of the temperature pattern determining unit;

a first calculator to be used during the rising state, which calculates estimated temperatures of the predetermined portion in time series based on a first calculation result obtained by executing calculation processing according to a first calculating formula when the temperature pattern determining unit determines that the temperature of the predetermined portion is in the rising state;

a second calculator to be used during the falling state, which calculates estimated temperatures of the predetermined portion in time series based on a second calculation result obtained by executing calculation processing according to a second calculating formula when the temperature pattern determining unit determines that the temperature of the predetermined portion is in the falling state; and a calculation result transferring unit that performs transfer of the first calculation result and the second calculation result between the first calculator and the second calculator, wherein, in a case where the state change determining unit determines that the temperature of the predetermined portion has changed from the falling state to the rising state when estimated temperatures to constitute a time series composed of estimated temperatures to be repeatedly calculated based on the first or second calculation result are calculated, respectively, the first calculator calculates the respective estimated temperatures based on calculation results that are obtained when calculating immediately previously calculated estimated temperatures to constitute the time series, and that are obtained by calculation processing according to the first calculating formula including the second calculation result which are given to the first calculator from the second calculator by the calculation result transferring unit, and wherein, in a case where the state change determining unit determines that the temperature of the predetermined portion has changed from the rising state to the falling state when estimated temperatures to constitute the time series are calculated, respectively, the second calculator calculates the respective estimated temperatures based on calculation results that are obtained when calculating immediately previously calculated estimated temperatures to constitute the time series, and that are obtained by calculation processing according to the second calculating formula including the first calculation result which are given to the second calculator from the first calculator by the calculation result transferring unit.

(10) The electric power steering apparatus according to (9), wherein the estimated temperatures of the predetermined portion are calculated based the value of a current flowing to the electric motor.

(11) The electric power steering apparatus according to (9), wherein the temperature pattern determining unit determines whether the temperature of the predetermined portion is rising or falling based the value of a current flowing to the electric motor.

(12) The electric power steering apparatus according to (9), further comprising a temperature sensor for detecting a temperature in the vicinity of the predetermined portion, wherein the temperature pattern determining unit determines whether the temperature is rising or falling based on the temperature detected by the temperature sensor.

According to a first aspect of the present invention, even if a detected value by the temperature detector is different from an atmosphere temperature by heat generation caused by driving an electric motor, it is possible to obtain an estimated atmosphere temperature value on the basis of the detected value and a temperature rise amount caused by the heat generation, and it is possible to calculate an estimated temperature value of a second protection object on the basis of the estimated atmosphere temperature value and a second temperature variation that is a temperature rise amount of a second protection object by the heat generation. Therefore, even if there is a plurality of objects to be protected from overheating, it is not required to provide temperature sensors as many as the number of objects to be protected from overheating and it is possible to estimate the temperature of the objects to be protected from overheating. Accordingly, it is possible to effectively protect the objects from overheating at low cost.

According to a second aspect of the present invention, even if the current as a heating source of an object to be protected from overheating is not current itself for driving a motor, and the first protection object and the second protection object is different in current, it is possible to correctly estimate the temperature of the respective objects to be protected from overheating (the first and second protection objects).

According to a third aspect of the present invention, since an estimated temperature value of the first protection object is calculated on the basis of a detected temperature value by a temperature detector disposed in the vicinity of the first protection object, it can be calculated more accurately than an estimated temperature value of the second protection object which is calculated on the basis of an estimated atmosphere temperature value. Therefore, a portion having a high possibility to be damaged due to overheating among a plurality of objects to be protected from overheating can be employed as the first protection object to be more surely protected from overheating.

According to a fourth aspect of the present invention, it is possible to obtain an estimated atmosphere temperature value based on the detected value and a temperature rise amount caused by the heat generation even if a detected value of a temperature detector for overheating protection is different from an atmosphere temperature by the heat generation caused by driving an electric motor, it is possible to obtain an estimated atmosphere temperature value on the basis of the detected value and a temperature rise amount caused by the heat generation, and it is possible to compensate the temperature of a predetermined portion on the basis of the estimation atmosphere temperature value. Therefore, it is possible to perform both of temperature compensation and overheating protection without increasing the number of temperature sensors.

According to a fifth aspect of the invention, the temperature pattern determining unit determines whether the temperature of a particular portion within the apparatus is rising or falling. Further, the temperature of the particular portion is estimated by calculating formulas that have constants of different values, respectively, when it is determined that the temperature is rising and when it is determined that the temperature is falling. Further, the values of the constants can be switched according to a determination result of the temperature pattern determining unit. Therefore, if a constant appropriate to a temperature change characteristic of a portion as an temperature-estimated object during temperature rise and a constant appropriate to a temperature change characteristic of the portion during temperature fall are prepared, the estimation of temperature appropriate to the temperature change characteristic of the portion can be made irrespective of whether the temperature is rising or falling. Further, when the estimated temperatures are calculated, calculation results obtained by calculation processing according to a calculating formula including a time series composed of estimated temperatures that are already calculated can be used. Therefore, the time series composed of the estimated temperatures that are already calculated can be reflected on the calculation processing irrespective of the switching of the constants. This enables the temperature of a portion as a temperature-estimated portion to be correctly estimated without causing an error between an estimated temperature and an actual temperature even if the temperature has changed from its falling state to its rising state or from its rising state to its falling state. Therefore, an upper limit of a current to be supplied to a motor can be obtained based on a temperature that is precisely estimated when the current is controlled. As a result, the current value can be limited to a proper value that does not cause overheating, so that respective parts within the apparatus can be prevented from being damaged due to overheating.

According to a ninth aspect of the invention, the temperature pattern determining unit determines whether the temperature of a particular portion within the apparatus is in a rising state or in a falling state. Also, when it is determined that the temperature is in the rising state, the first calculator estimates the temperature of the particular portion based on a result of calculation processing according to the first calculating formula, and when it is determined that the temperature is falling, the second calculator estimates the temperature of the particular portion based on a result of calculation processing according to the second calculating formula. Therefore, by employing an calculating formula appropriate to a temperature change characteristic of a portion as a temperature-estimated portion during temperature rise as the first calculating formula, and by employing a calculating formula appropriate to a temperature change characteristic of the portion during temperature fall rise as the second calculating formula, the temperature of the portion can be estimated based on the result of calculation processing according to a calculating formula appropriate to the temperature change characteristic of the portion irrespective of whether the temperature is rising or falling. Further, when the temperature has changed from its falling state to its rising state, or when the temperature has changed from its rising state to its falling state, a newest estimated temperature can be calculated using calculation results obtained when calculating estimated temperatures that are calculated immediately before the state has changed. This prevents an error from occurring between an estimated temperature and an actual temperature when the temperature state has changed, which in turn makes it possible to correctly estimate the temperature of a portion as an temperature-estimated object even when temperature rise and temperature fall are repeated. Therefore, an upper limit of a current to be supplied to a motor can be obtained based on a temperature that is preciously estimated when the current is controlled. As a result, the current value can be limited to a proper value that does not cause overheating, so that respective parts within the apparatus can be prevented from being damaged due to overheating.

DETAILED DESCRIPTION OF PREFERRED EMBODIMENTS

Hereinafter, preferred embodiments of the present invention will be described with reference to the drawings.

First Embodiment

<1. Whole Structure>

Figure 1:
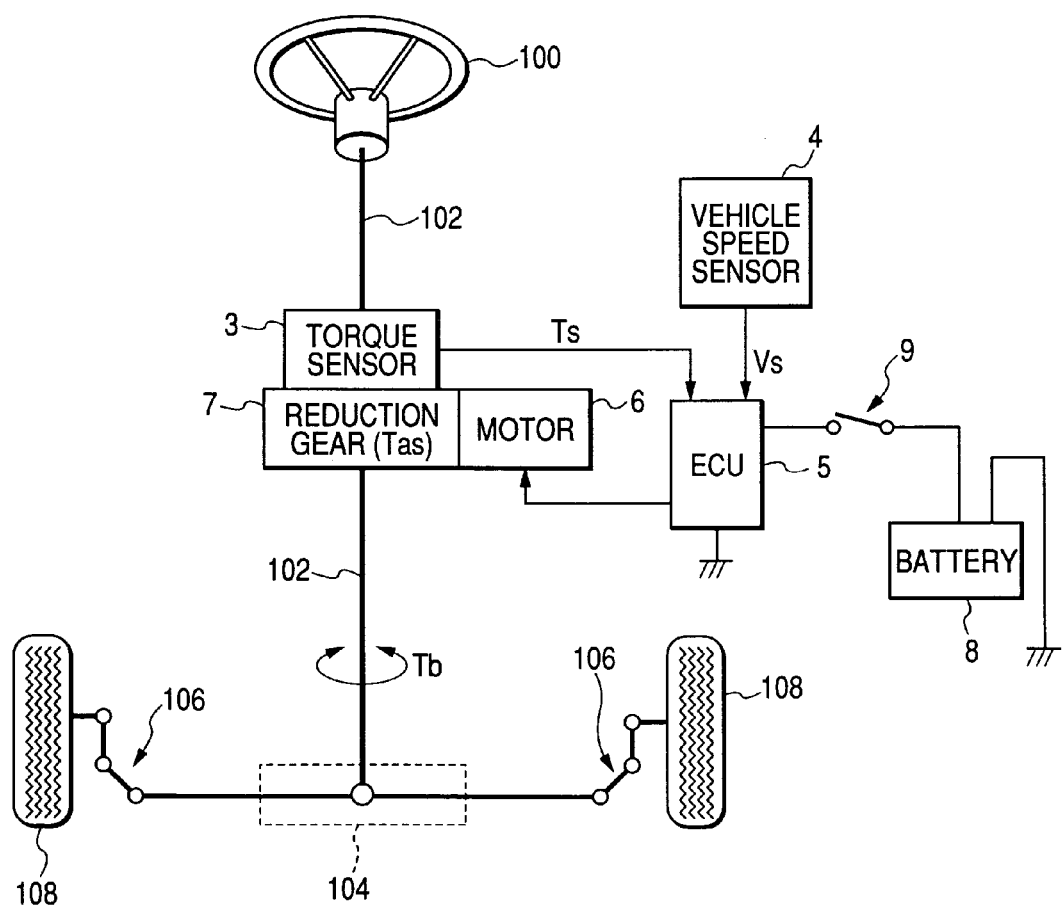
FIG. 1 is a schematic view illustrating the structure of an electric power steering apparatus according to an embodiment of the present invention along with that of a vehicle associated with the apparatus.

FIG. 1 is a schematic view illustrating the structure of an electric power steering apparatus according to a first embodiment of the present invention along with that of a vehicle associated with the apparatus. The electric power steering apparatus comprises a steering shaft 102 whose one end is fixed to a handle (a steering wheel) 100 as an operating member for steering, a rack pinion mechanism 104 connected to the other end of the steering shaft 102, a torque sensor 3 for detecting a steering torque applied to the steering shaft 102 by the operation of the handle 100, a vehicle speed sensor 4 for detecting a traveling speed of the vehicle, an electric motor 6 for generating a steering auxiliary force to reduce a driver's load in operating the handle, a reduction gear 7 for transmitting a steering auxiliary force generated by the motor 6 to the steering shaft 102, and an electronic control unit (ECU) 5 for receiving power from a vehicle-mounted battery 8 and controlling the drive of the motor 6 based on a sensor signal from the torque sensor 3 or the vehicle speed sensor 4.

When a driver operates the handle 100 of a vehicle equipped with such an electric power steering apparatus, a steering torque generated by the operation is detected by the torque sensor 3 and the motor 6 is driven by the ECU 5 based on a detected value of a steering torque Ts and a vehicle speed Vs detected by the vehicle speed sensor 4. In this way, the motor 6 generates a steering auxiliary force which is in turn applied to the steering shaft 102 through the reduction gear 7, whereby a driver's load in steering operation is reduced. That is, an output torque Tb that is the sum of a steering torque Ts applied by the handle operation and a torque Tas by a steering auxiliary force generated by the motor 6 can be applied to the rack pinion mechanism 104 through the steering shaft 102. Thereby, when the pinion shaft rotates, the rotation is converted into the reciprocating motion of a rack shaft by the rack pinion mechanism 104. The direction of a wheel 108 is changed by the reciprocating motion of the rack shaft because both ends of the rack shaft are connected to the wheel 108 through a connecting member 106 having a tie rod and a knuckle arm.

<2. Structure and Operation of Controller>

Figure 2:
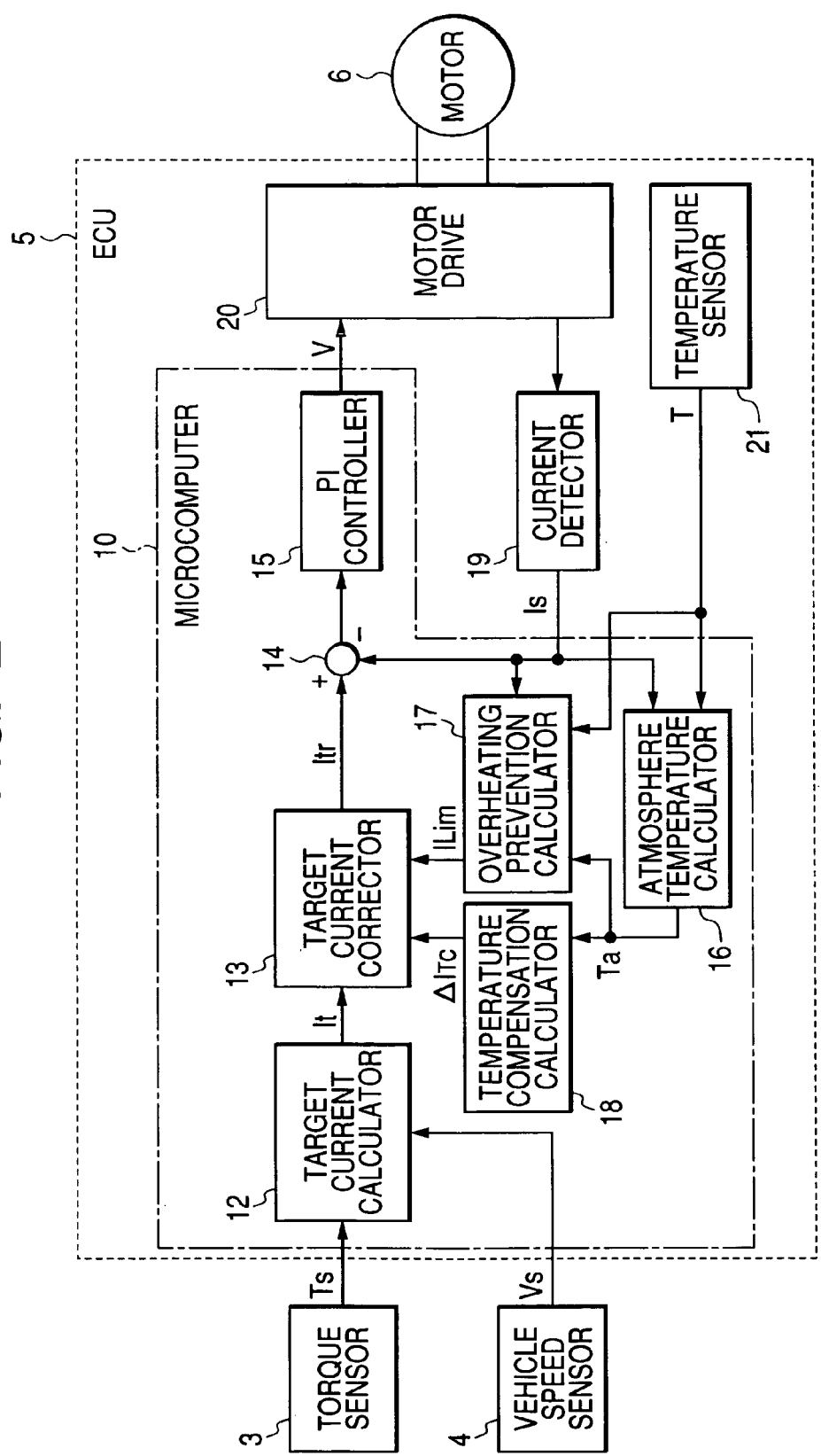
FIG. 2 is a block diagram illustrating the structure of the electric power steering apparatus related to the embodiment as seen from the viewpoint of control.

FIG. 2 is a block diagram illustrating the structure of the electric power steering apparatus as seen from the viewpoint of control. The ECU 5 that is a controller of the electric power steering apparatus includes a target current calculator 12, a target current corrector 13, a subtracter 14, a PI controller 15, an atmosphere temperature calculator 16, an overheating prevention calculator 17, a temperature compensation calculator 18, a motor drive 20, a current detector 19, and a temperature sensor 21. A signal indicating a detected value of the steering torque Ts detected by the torque sensor 3 and a signal indicating a detected value of the vehicle speed Vs detected by the vehicle speed sensor 4 are input to the target current calculator 12. Among the components of the ECU 5, the target current calculator 12, the target current corrector 13, the subtracter 14, the PI controller 15, the atmosphere temperature calculator 16, the overheating prevention calculator 17, and the temperature compensation calculator 18 are implemented in software by allowing a microcomputer 10 to execute a predetermined program.

The target current calculator 12 calculates a target current value to be supplied to the motor 6 and outputs the calculated value as a target current value It, based on a detected value of the steering torque Ts which indicates a signal from the torque sensor 3 and a detected value of the vehicle speed Vs which indicates a signal from the vehicle speed sensor 4. The target current corrector 13 corrects the target current value It output from the target current calculator 12 based on an upper limit ILim of a target current output from the overheating prevention calculator 17 to be described later and a temperature compensation current value ΔITc output from the temperature compensation calculator 18, whereby the post-correction target current value Itr is generated. The generation of the post-correction target current value Itr will be described in detail below.

The current detector 19 detects a current actually supplied to the motor 6 and outputs a detected current value (a motor current value) Is indicating the current. The subtracter 14 calculates a difference Itr-Is between the post-correction target current value Itr output from the target current corrector 13 and a detected current value Is output from the current detector 19. The PI controller 15 generates a voltage command value V by a proportional integration control calculation based on the difference Itr-Is. The motor drive 20 includes a drive circuit composed of a plurality of power-MOS transistors (hereinafter, referred to as an 'FET') as a switching element and turns on or off the FET by a PWM signal (a pulse width modulation signal) of a pulse width (duty ratio) corresponding on a voltage command value V, thereby applying a voltage to the motor 6 by the voltage command value V.

The temperature sensor 21 is disposed in the vicinity of the motor drive 20 and outputs a detected temperature value T indicating the temperature of the disposed position.

As described below, the atmosphere temperature calculator 16 calculates an estimated atmosphere temperature value Ta of the ECU 5 based on the detected current value Is and the detected temperature value T. The detected temperature value T is a value obtained by adding a temperature rise amount of the temperature sensor 21 caused by thermal conduction from a heater to an atmosphere temperature. Here, the temperature rise amount caused by thermal conduction from a heater is a temperature rise amount of the temperature sensor 21 caused by the heat generation caused by driving of the motor and may be approximated by a first order lag of a squared value of the detected current value Is. Thus, the estimated atmosphere temperature value Ta is calculated by the following equation.

$$Ta = T - Ga \cdot Is/(1 + \tau a \cdot S) \qquad (1)$$

where Ga indicates a gain constant of a first order lag element that simulates the thermal conduction and τa means indicates a time constant of a first order lag element. Particular values of Ga and τa are determined based on measured data. Further, Is2 is a squared value of a detected current value Is, and S is a complex variable by Laplace transform (this is true of the followings). The estimated atmosphere temperature value Ta calculated like this is input to the overheating prevention calculator 17 and the temperature compensation calculator 18. In addition, Equation (1) is an equation for a Laplace operator function, and in actuality, the estimated atmosphere temperature value Ta is calculated by repeating in time series from time series data of the detected temperature value T and the detected current value Is by numerical calculation corresponding to Equation (1) by the microcomputer 10.

The overheating prevention calculator 17 receives the detected current value Is output from the current detector 19 and the detected temperature value T output from the temperature sensor 21 and calculates an estimated temperature value of each portion to be an object to be protected from overheating based on the estimated atmosphere temperature value Ta and the detected current value Is (however, in the present embodiment, an estimated temperature value of an object to be protected from overheating, which is positioned in the vicinity of the temperature sensor 21, is calculated based on the detected temperature value T and the detected current value Is). Further, the overheating prevention calculator 17 calculates a maximum current value (upper limit of a current) of each portion capable of being supplied to the motor 6 based on the estimated temperature value of each portion as an object to be protected from overheating. A minimum value among current upper limits calculated for each portion is output from the overheating prevention calculator 17 as a target current upper limit ILim. The target current upper limit ILim is input to the target current corrector 13 and is used for generating the post-correction target current value Itr.

The temperature compensation calculator 18 requires a current value ΔITc (hereinafter, referred to as a 'temperature compensation current value') to be added to a target current value It in order to compensate a temperature characteristic of a predetermined portion in the electric power steering apparatus according to the present embodiment, based on an estimated atmosphere temperature value Ta output from the atmosphere temperature calculator 16.

Figure 3:
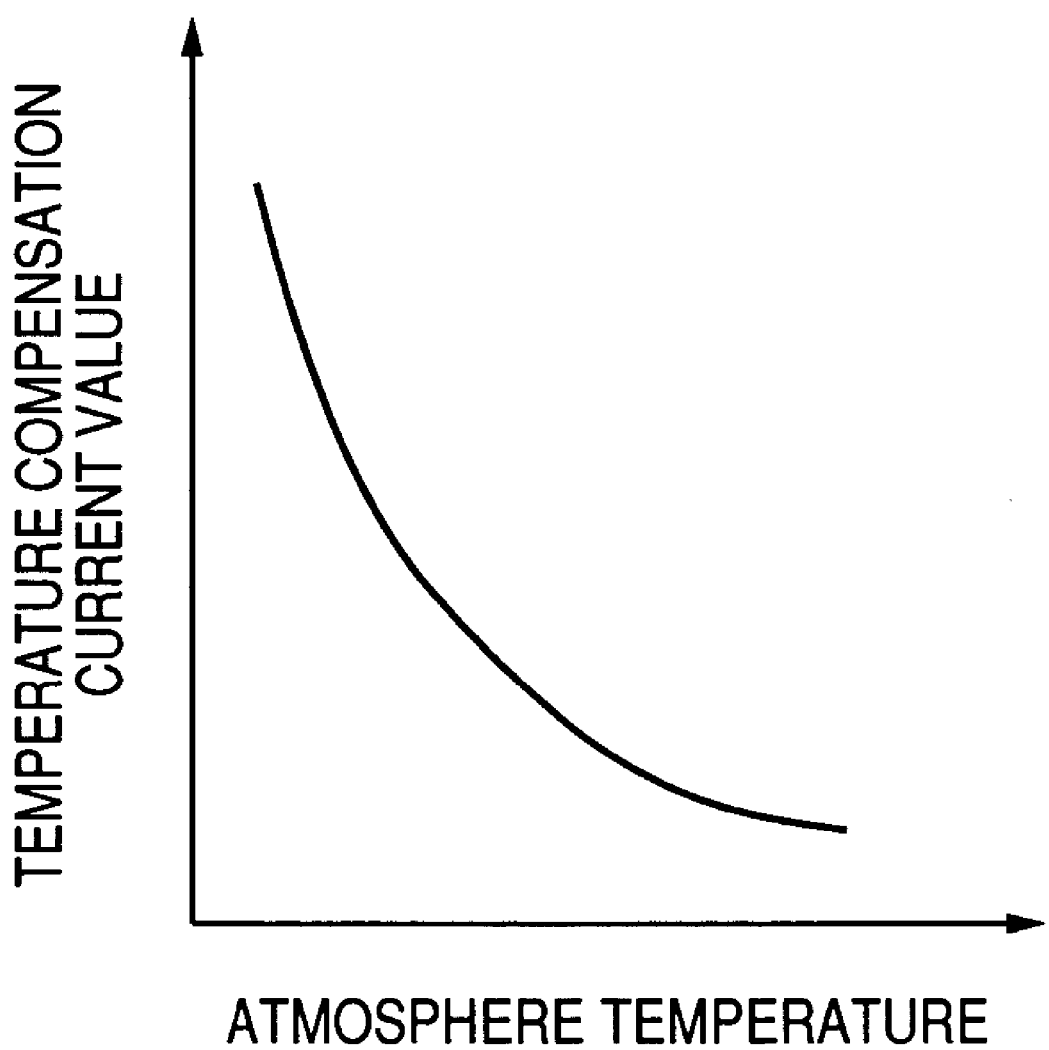
FIG. 3 is a view illustrating an example of a temperature compensation map showing the relationship between an atmosphere temperature and a temperature compensation current value to be added to a target current value in order to compensate a temperature characteristic of a predetermined portion in the embodiment.

Specifically, a function or map that defines the relationship between a temperature compensation current value to compensate a temperature characteristic of a predetermined portion and an atmosphere temperature is stored in the temperature compensation calculator 18, and the temperature compensation current value ΔITc corresponding to the estimated atmosphere temperature value Ta is obtained based on the function or map. For example, when compensating a temperature characteristic of viscosity of grease used in the reduction gear 7, the temperature compensation current value ΔITc corresponding to the estimated atmosphere temperature value Ta may be obtained based on a map as shown in FIG. 3 that defines the relationship between a temperature compensation current value ΔITc for the temperature compensation and an atmosphere temperature. In this case, the temperature compensation current value ΔITc is determined so as to increase the motor current as the estimated atmosphere temperature value Ta is low because the viscosity of grease increases as the atmosphere temperature is lower. The temperature compensation current value ΔITc determined like this is also input to the target current corrector 13 and is used for generating the post-correction target current value Itr.

<3. Structure and Operation for Protection from Overheating and Temperature Compensation>

Figure 4:
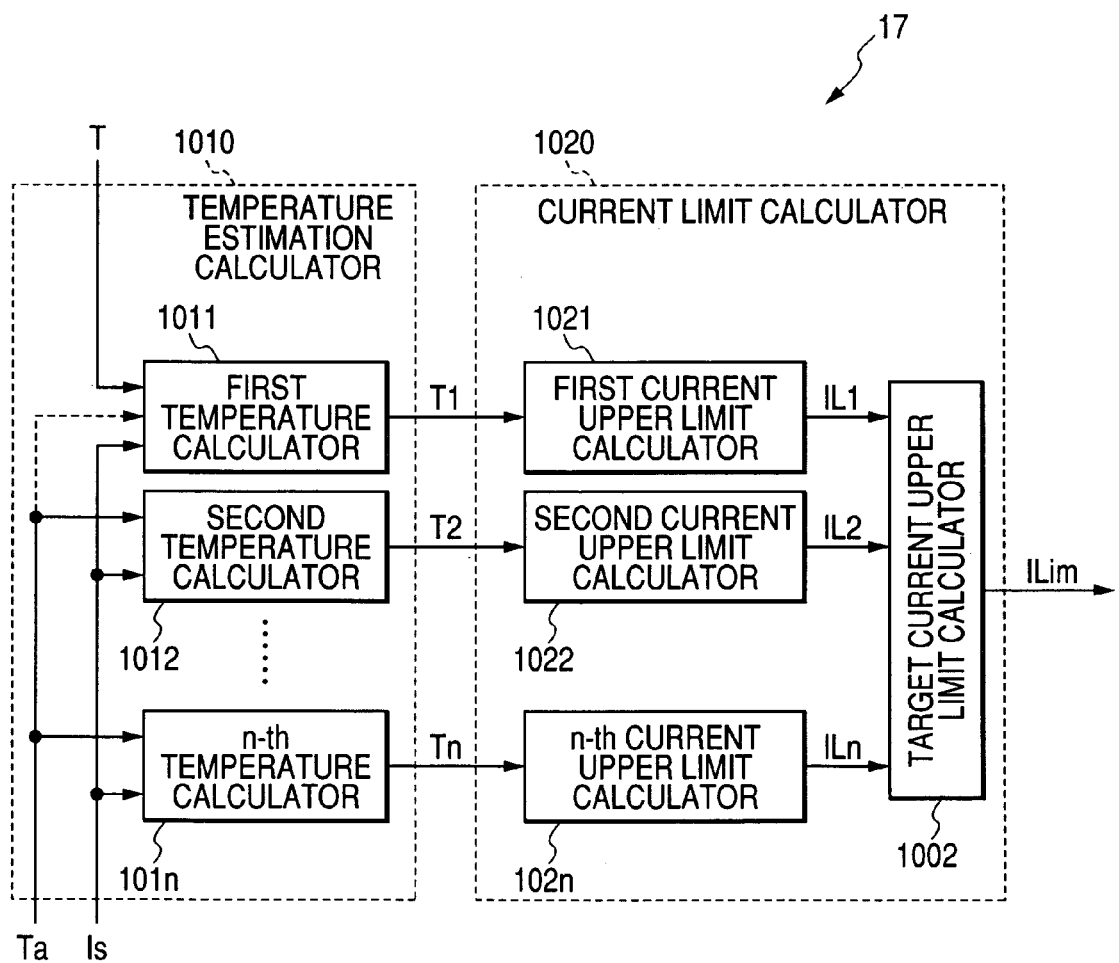
FIG. 4 is a block diagram illustrating details of an overheating prevention calculator in the embodiment.

FIG. 4 is a functional block diagram illustrating the structure of an overheating prevention calculator 17 in the electric power steering apparatus. Hereinafter, the overheating prevention calculator 17 will be described in detail with reference to FIG. 4. Further, the 'n' portions of first to n-th protection objects exist as portions to be protected from overheating caused by the heat generation caused by driving of the motor 6, and the first protection object among the portions is the motor drive 20, but components (for example, each FET) of the motor drive 20 or the microcomputer 10, etc. may be each protection object. Further, although a brush or a coil, etc. within the motor 6 may be a protection object in addition to the motor drive 20, the components within the ECU 5 will be described below as a protection object.

The overheating prevention calculator 17 includes a temperature estimation calculator 1010 for calculating estimated temperature values of the first to n-th protection objects and a current limit calculator 1020 for calculating the first to n-th current upper limits IL1 to ILn to protect the first to n-th protection objects from overheating based on the estimated temperature values T1 to Tn. The temperature estimation calculator 1010 has first to n-th temperature calculator 1011 to 101n and the current limit calculator 1020 has first to n-th current upper limit calculator 1021 to 102n and the target current upper limit calculator 1002. Here, the first to n-th temperature calculators 1011 to 101n calculate estimated temperature values T1 to Tn of the first to n-th protection objects, respectively and the first to n-th current upper limit calculators 1021 to 102n calculate the first to n-th current upper limits IL1 to ILn, respectively.

As shown in FIG. 2, the temperature sensor 21 is disposed in the vicinity of the motor drive 20 that is the first protection object, and the first temperature calculator 1011 calculates an estimated temperature value T1 of the first protection object based on a detected current value Is and a detected temperature value T as in a conventional technique. For example, as in a protection unit of an electric power steering apparatus disclosed in Patent Document 2 (Japanese Utility Model Registration No. 2586020), a temperature rise caused by the heat generation (Joule heat) caused by driving of the motor may be simulated by a first order lag element. In this case, a temperature rise amount ΔT1 of the first protection object by the heat generation caused by driving of the motor is expressed by the following equation and an estimated temperature value T1 of the first protection object is calculated by adding the temperature rise amount ΔT1 to the detected temperature value T by the temperature sensor 21.

$$\Delta T1 = G1 \cdot Is/(1+\tau 1 s) \tag{2}$$

where G1 indicates a gain constant of the first order lag element and τ1 indicates a time constant of the first order lag element and particular values of G1 and τ1 are determined based on measured data. Further, Equation (2) is an equation for a Laplace operator function, and in actuality, the temperature rise amount ΔT1 and an estimated temperature value T1 of the first protection object are repeatedly calculated in time series by numerical calculation corresponding to Equation (2) by the microcomputer 10.

As described below, the second to n-th temperature calculator 1012 to 101n calculate estimated temperature values T2 to Tn of the second to n-th protection object, respectively, based on the estimated atmosphere temperature value Ta and the detected current value Is. The temperature of a jth protection object is a value obtained by adding a temperature rise amount of the jth protection object caused by the heat generation (Joule heat) caused by driving of a motor to the atmosphere temperature. (j is an integer that satisfy 2≦j≦n) Here, a temperature rise amount based on Joule heat may be approximated by the first order lag of a squared value of the detected current value Is. Therefore, an estimated temperature value Tj of the jth protection object is calculated by the following equation.

$$Tj = Ta + Gj \cdot Is/(1+\tau j \cdot S) \tag{3}$$

where Gj indicates a gain constant of the first order lag element for approximating a temperature rise of the jth protection object by Joule heat, τj indicates a time constant of the first order lag element and particular values of Gj and τj are determined based on measured data. Further, Equation (3) is an equation for a Laplace operator function and in actuality, an estimated temperature value Tj of the jth protection object is repeatedly calculated in time series from time series data of the estimated atmosphere temperature value Ta and the detected current value Is by numerical calculation corresponding to Equation (3) by the microcomputer 10.

Figure 5:
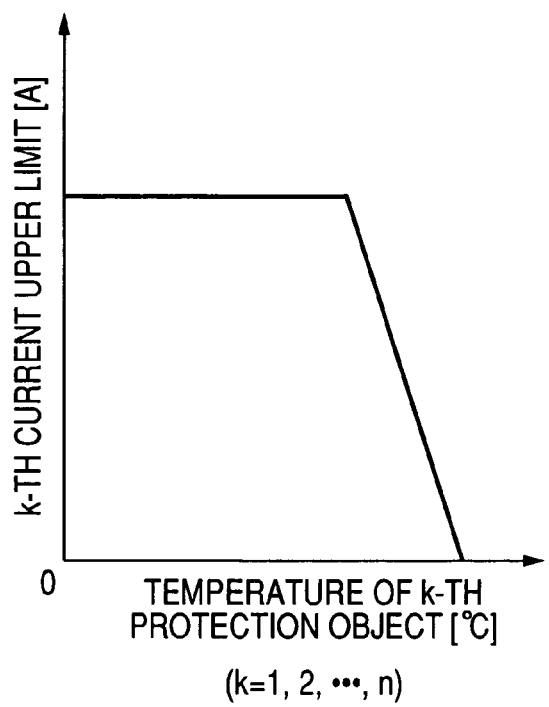
FIG. 5 is a view illustrating an example of an overheating prevention map showing the relationship between the temperature of a protection object to be protected from overheating and an upper limit of a drive current for driving a motor in the embodiment.

The estimated temperature values T1 to Tn of the first to n-th protection objects calculated as described above are input to the first to n-th current upper limit calculators 1021 to 102n, respectively. The respective first to n-th current upper limit calculators 1021 to 102n calculates upper limits (hereinafter, referred to as 'current upper limits') IL1 to ILn of a motor drive current which can be allowed by the first to N-th protection objects from viewpoint of protection from overheating, based on such estimated temperature values T1 to Tn. That is, a k-th current upper limit calculator $102k$ stores a function or map that defines the relationship between the temperature of the k-th protection object and the k-th current upper limit that is a current upper limit in which the k-th protection object is not broken by overheating, and outputs a current upper limit ILk corresponding to an estimated temperature value Tk from the k-th temperature calculator $101k$ based on the function or map. For example, each current upper limit calculator $102k$ stores the map shown in FIG. 5 as a map (hereinafter, referred to as an 'overheating prevention map') showing the relationship between a temperature and a current upper limit of a protection object (the k-th protection object) concerned, and outputs as the k-th current upper limit ILk a current upper limit corresponding to the estimated temperature value Tk of the k-th protection object by a map for protecting from overheating (k is an integer that satisfies $1 \leq k \leq n$) The current upper limits IL1 to ILn output from the first to n-th current upper limit calculators 1021 to $102n$ are input to a target current upper limit calculator 1002. The target current upper limit calculator 1002 outputs the minimum value among the first to n-th current upper limits IL1 to ILn as a target current upper limit ILim.

Figure 6:
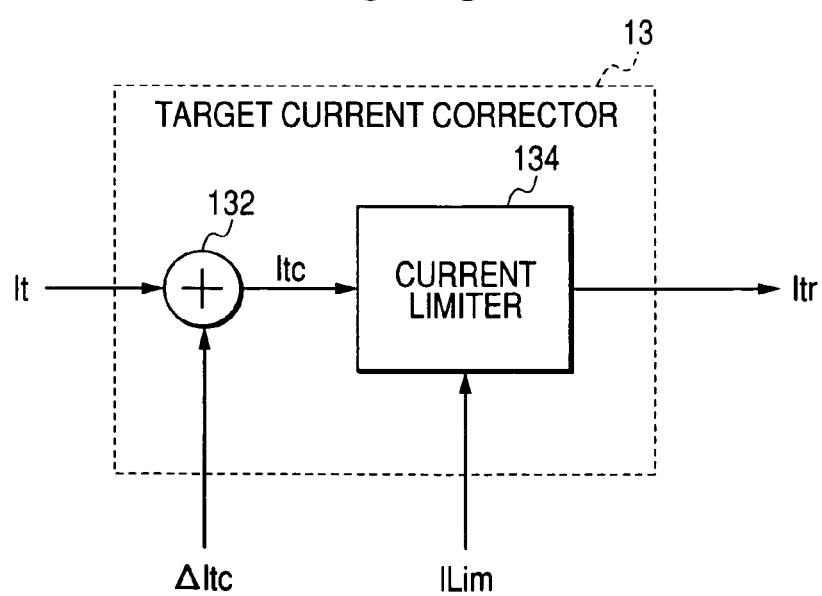
FIG. 6 is a block diagram illustrating the structure of a target current corrector in the embodiment.

FIG. 6 is a functional block diagram illustrating the structure of the target current corrector 13 in the present embodiment. The target current corrector 13 includes an adder 132 and a current limiter 134. A target current input It and a temperature compensation current value ΔITc are input to the adder 132 and a target current upper limit ILim is input to the current limiter 134. The adder 132 corresponds to a target value corrector and adds the target current It to the temperature compensation current value ΔITc and outputs the added result It+ΔITc as a post-compensation target current value Itc. The post-compensation target current value Itc is input to the current limiter 134. The current limiter 134 outputs the post-compensation target current value Itc as the post-correction target current value Itr when the post-compensation target current value Itc is under the target current upper limit ILim, and outputs the target current upper limit ILim as the post-correction target current value Itr when the post-compensation target current value Itc is over a target current upper limit ILim.

As described above, in the adder 132, a temperature characteristic of a predetermined portion, for example, the reduction gear 7 (its grease viscosity) is compensated by adding the temperature compensation current value ΔITc to the target current value It. Further, in the current limiter 134, the post-compensation target current value Itc is limited based on the target current upper limit ILim, whereby the post-correction target current value Itr that is a current command value for drive control of the motor 6 does not exceed any one of the first to n-th current upper limits IL1 to ILn corresponding to the respective first to n-th protective objects. In this way, in the present embodiment, a current to flow to the motor 6 based on such estimated temperature values T1 to Tn is limited to protect the first to n-th protection objects from overheating, whereby a current limiter is implemented by the current limit calculator 1020 within the overheating prevention calculator 17 and the current limiter 134 within the target current corrector 13.

<4. Effects>

According to the present embodiment as described above, the atmosphere temperature calculator 16 as shown in FIG. 2, calculates the estimated atmosphere temperature value Ta based on the detected temperature value T and the detected current value Is, and the overheating prevention calculator 17 as shown in FIG. 4, calculates estimated temperature values T2 to Tn of the second to n-th protection objects based on the estimated atmosphere temperature value Ta and the detected current value Is, and calculates the estimated temperature value T1 of the first protection object based on the detected temperature value T and the detected current value Is. Current upper limits IL1 to ILn of the first to n-th protection objects are calculated based on such estimated temperature values T1 to Tn, and the smallest value among the current upper limits IL1 to ILn T1 is used as the target current upper limit ILim. Therefore, even if a portion (hereinafter, referred to as the weakest portion), which is apt to be broken most easily by overheating, among each portion of the electric power steering apparatus is changed by an operation state of the apparatus concerned, a plurality of portions having possibility of the weakest portion become the first to n-th protection objects. As a result, it is possible to surely prevent each portion of the electric power steering apparatus from being damaged by overheating. Further, according to the present embodiment, since the estimated temperature values T1 to Tn of the second to n-th protection objects are calculated by using the estimated atmosphere temperature value Ta which is calculated based on the detected temperature value T from the temperature sensor 21 disposed in the vicinity of the first protection object and the detected current value Is, it is unnecessary to dispose temperature sensors in the vicinity of the second to n-th protection objects. That is, it is possible to prevent portions from being damaged by overheating without increasing the number of temperature sensors (one temperature sensor as the minimum) even if a plurality of portions to be the weakest portion exists.

In addition, it is preferable to dispose the temperature sensor 21 in the vicinity of a protection object having the most possibility (probability) to be the weakest portion among the first protection object to the n-th protection object (from the viewpoint of the estimated accuracy of the temperature in the weakest portion). However, when it is difficult to dispose the temperature sensor 21 in the vicinity of the weakest portion, the temperature sensor 21 may be disposed in the vicinity of the protection object to be easily disposed among the other protection object (the second protection object to the n-th protection object) instead of the vicinity of the protection object corresponding to the weakest portion (the first protection object in the above embodiment). Therefore, the present embodiment has an advantage in the degree of freedom in arrangement of the temperature sensor, compared to a conventional example in which the temperature sensor is disposed in the vicinity of the weakest portion.

Further, in the present embodiment, as shown in FIG. 2, the temperature compensation current value ΔITc is calculated based on the estimated temperature value T and the estimated atmosphere temperature value Ta calculated from the detected current value Is. Temperature compensation is performed by adding the temperature compensation current value ΔITc to the target current value It. Therefore, since the temperature sensor 21 provided for overheating protection may be used for temperature compensation, it is possible to perform both of temperature compensation and overheating protection without increasing the number of temperature sensors, thereby reducing the cost for temperature compensation.

<5. Modification>

In the above embodiment, temperature rise in the first to n-th protection objects is caused by the heat generation (Joule heat) caused by a motor drive current that indicates the detected current value Is. However, the present invention is not limited thereto and a current that generates Joule heat as a source of the temperature rise in the first to n-th protection objects may be different depending on the protection objects. For example, the current that generates Joule heat as a source of temperature rise of the first protection object is a drive current, but the current that generates Joule heat as a source of temperature rise of the second protection object may be a current different from the drive current (for example, a current flowing to only a specific switching element constituting a drive circuit). In this case, the second temperature calculator calculates the estimated temperature value T2 of the second protection object based on the different current values and the estimated atmosphere temperature value Ta from the atmosphere temperature calculator 16.

Further, in the above embodiment, the estimated temperature value T1 of the first protection object is calculated based on the detected current value Is and the detected temperature value T from the temperature sensor 21 disposed in the vicinity of the first protection object. However, the estimated temperature value may be calculated based on the detected current value Is and the estimated atmosphere temperature value Ta from the atmosphere temperature calculator 16 (see signal lines denoted by a dotted line in FIG. 4).

In addition, in the embodiment, there are the first to n-th protection objects as portions to be protected from overheating and the temperature sensor 21 is disposed only in the vicinity of the first protection object among them. However, the present invention is not limited thereto and can be applied to a structure having a plurality of protection objects including a protection object around which a temperature detector is disposed and a protection object around which a temperature detector is not disposed.

Further, in the above embodiment, the motor drive 20 is employed as one protection object (the first protection object). However, when the motor drive 20 includes a plurality of circuit boards mounted with power MOS transistors (FETs), a temperature sensor is disposed only on one circuit board as a first protection object among such circuit boards, and other circuit boards may be handled as separate protection objects (a second protection object, a third protection object, . . . ). In addition, when a plurality of FETs are mounted on one circuit board, a temperature sensor is disposed in the vicinity of one FET as a first protection object among such FETs and the other FETs in one circuit board may be handled as separate protection objects (a second protection object, a third protection object, . . . ).

Second Embodiment

<1. Whole Structure>

A main structure according to the second embodiment is substantially the same as the structure according to the first embodiment as shown in FIG. 1.

<2. Structure and Operation of Controller>

Figure 7:
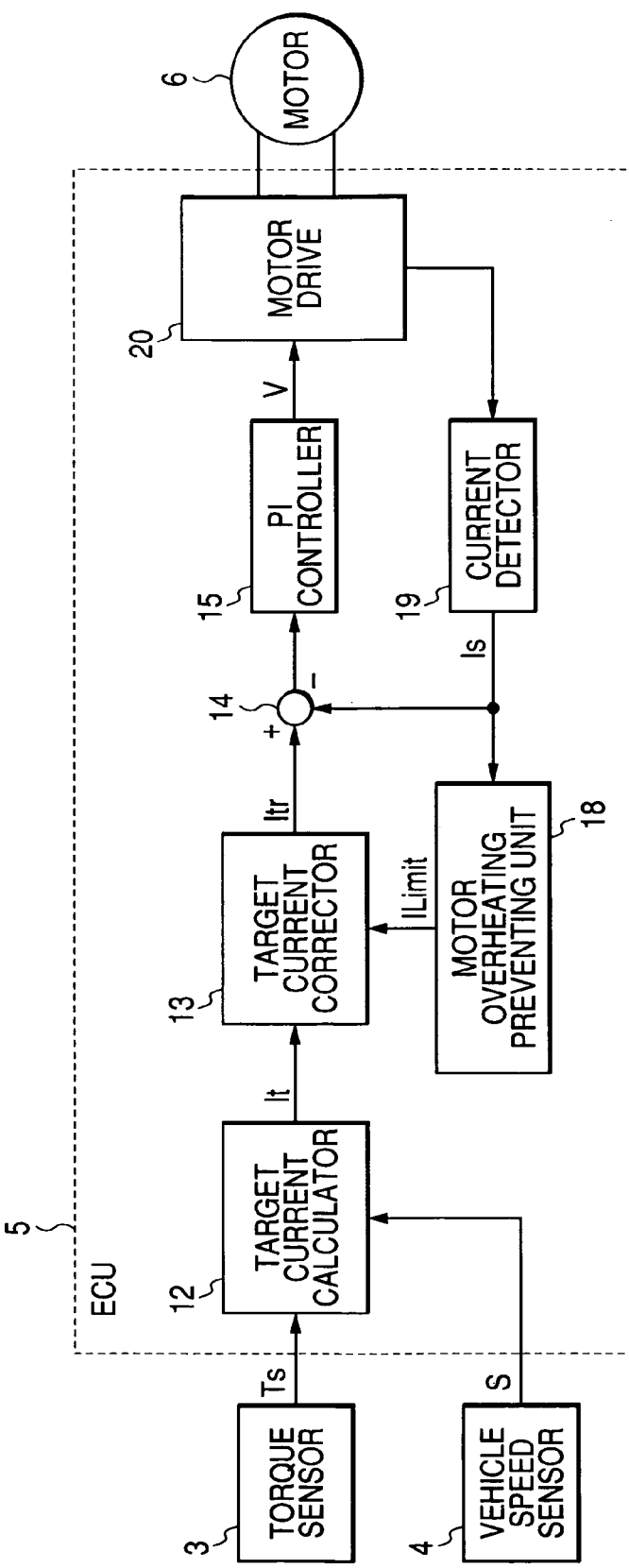
FIG. 7 is a block diagram showing the structure of the electric power steering apparatus according to the embodiment as seen from the viewpoint of control.

FIG. 7 is a block diagram illustrating the structure of the electric power steering apparatus as seen from the viewpoint of control. The ECU 5 that is a controller of the electric power steering apparatus includes a target current calculator 212, a target current corrector 213, a subtracter 214, a PI controller 215, a motor drive 220, a current detector 219, and a motor overheating preventing unit 218. The torque sensor 3 detects a steering torque applied by the operation of the handle 100, and outputs a signal indicating a detected value of the steering torque as a steering torque signal Ts. The vehicle speed sensor 4 detects a traveling speed of a vehicle equipped with the electric power steering apparatus, and outputs a signal indicating a detected value of the traveling speed as a vehicle speed signal Vs.

The target current calculator 212 calculates a target current value to be supplied to the motor 6 and outputs the calculated value as a target current value It, based on a detected value of the steering torque Ts which indicates a signal from the torque sensor 3 and a detected value of the vehicle speed Vs which indicates a signal from the vehicle speed sensor 4. The target current corrector 213 corrects the target current value It output from the target current calculator 212 based on an upper limit ILim of a target current output from the overheating prevention calculator 217 to be described later and a temperature compensation current value ΔITc output from the temperature compensation calculator 218, whereby the post-correction target current value Itr is generated. The generation of the post-correction target current value Itr will be described in detail below.

The current detector 219 detects a current actually supplied to the motor 6 and outputs a detected current value (a motor current value) is indicating the current. The subtracter 214 calculates a difference Itr-Is between the post-correction target current value Itr output from the target current corrector 213 and a detected current value Is output from the current detector 219. The PI controller 215 generates a voltage command value V by a proportional integration control calculation based on the difference Itr-Is. The motor drive 220 includes a drive circuit composed of a plurality of power-MOS transistors (hereinafter, referred to as an 'FET') as a switching element and turns on or off the FET by a PWM signal (a pulse width modulation signal) of a pulse width (duty ratio) corresponding to a voltage command value V, thereby applying a voltage to the motor 6 by the voltage command value V.

The motor overheating preventing unit 218 receives the detected current value Is output from the current detector 219, and calculates an estimated temperature of a portion as an object to be prevented from overheating based on the detected current value Is. Further, the motor overheating preventing unit 218 calculates a maximum current value (a current limit value) capable of being supplied to the motor 6 for each portion based on the estimated temperature of the corresponding portion. Also, a minimum value among the current limit values calculated for each portion is output from the motor overheating preventing unit 218 as a target current upper limit ILimit. In the present embodiment, a mass part, a coil, a brush, etc. within the motor 6 may be a portion as an object to be prevented from overheating. The current upper limit ILimit is determined based on an estimated temperature of each of these portions.

In addition, among the components of the ECU 5, the target current calculator 212, the target current corrector 213, the subtracter 214, the PI controller 215, and the motor overheating preventing unit 218 are implemented in software by allowing a microcomputer to execute a predetermined program.

<3. Motor Overheating Preventing Processing>
<3.1 Structure of Motor Overheating Preventing Unit>

Figure 8:
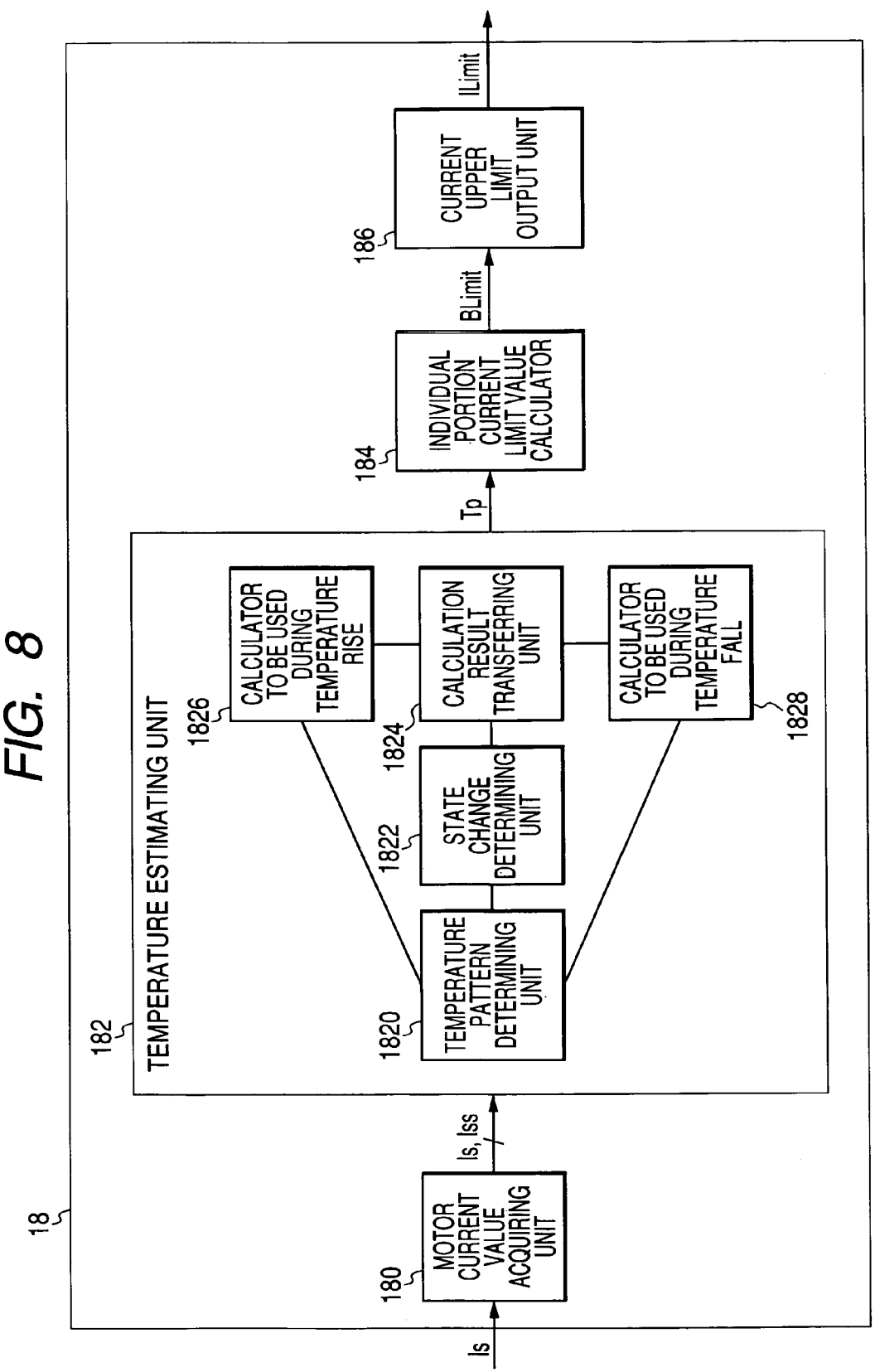
FIG. 8 is a functional block diagram showing details of a motor overheating preventing unit in the embodiment.

Next, the processing (motor overheating preventing processing) for preventing overheating of each portion within the motor 6 in the present embodiment will be described. FIG. 8 is a functional block diagram illustrating details of the motor overheating preventing unit 218 of the electric power steering apparatus. The motor overheating preventing unit 218 includes a motor current value acquiring unit 380, a temperature estimating unit 382, an individual portion current limit value calculator 384, and a current upper limit output unit 386. The temperature estimating unit 382 includes a temperature pattern determining unit 1820, a state change determining unit 1822, a calculation result transferring unit 1824, a calculator 1826 to be used during temperature rise, and a calculator 1828 to be used during temperature fall. The motor current value acquiring unit 380 receives a motor current value Is output from the current detector 219 with a predetermined period, squares the motor current value Is to calculate the squared motor current value Iss, and outputs the motor current value Is and the squared motor current value Iss. The temperature pattern determining unit 1820 determines whether the temperature is rising or falling based on the motor current value Is. The calculator 1826 to be used during temperature rise calculates an estimated temperature Tp of each portion according to a calculating formula previously defined for each portion based on actually measured data during temperature rise. The calculator 1828 to be used during temperature fall calculates an estimated temperature Tp of each portion according to a calculating formula previously defined for each portion based on actually measured data during temperature fall. Here, if the temperature pattern determining unit 1820 determines that the temperature is rising, the estimated temperature Tp of each portion is calculated by the calculator 1826 to be used during temperature rise, and if the temperature pattern determining unit 1820 determines that the temperature is falling, the estimated temperature Tp of each portion is calculated by the calculator 1828 to be used during temperature fall.

The state change determining unit 1822 determines based on a determination result of the temperature pattern determining unit 1820 whether the temperature corresponds to any one of states in which the temperature changes (hereinafter, referred to as a 'temperature change state') such as 'the temperature has changed from its rising state to its falling state' and 'the temperature has changed from its falling state to its rising state' (hereinafter, referred to as a 'rising state' or a 'falling state'). If the state change determining unit 1822 determines that the temperature state has changed (the temperature has changed from its rising state to its falling state, or the temperature has changed from its falling state to its rising state), the calculation result transferring unit 1824 gives a calculation result calculated by the calculator 1826 to be used during temperature rise or the calculator 1828 to be used during temperature fall which has performed temperature estimating processing before the change in a temperature state to the other calculator. The individual portion current limit value calculator 384 calculates a current limit value BLimit of each portion based on the estimated temperature Tp of each portion. The current upper limit output unit 386 outputs a current upper limit ILimit indicating an upper limit of the target current value It based on the current limit value BLimit calculated for each portion.

<3.2 Operation of Motor Overheating Preventing Unit>

Figure 9:
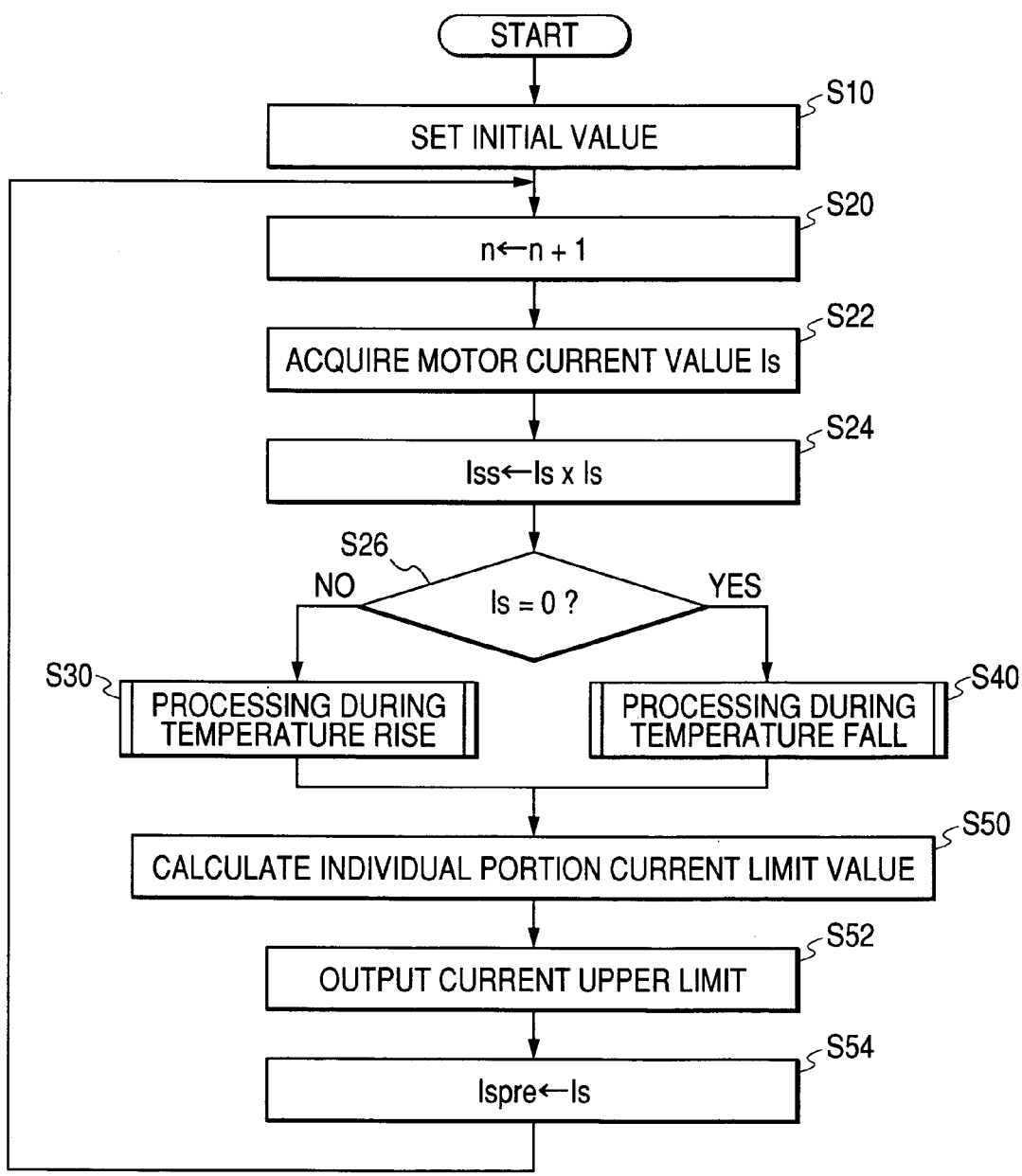
FIG. 9 is a flowchart showing the procedure of motor overheating preventing processing.

The above-described functional structure shown in FIG. 8 is implemented by allowing the above-mentioned microcomputer to execute a predetermined program. Hereinafter, referring to FIG. 9, the operation of the microcomputer for implementing the respective functional blocks shown in FIG. 8 will be described.

When an ignition switch 9 is turned on, initial values of individual parameters in the motor overheating preventing processing shown in the flow chart are set (Step S10). In the motor overheating preventing processing, the parameters includes a counter n, a present motor current value Is, a previous motor current value Ispre, a squared motor current value Iss, an integrated squared mass part current value Imass1 during temperature rise, an integrated squared coil current value Icoil1 during temperature rise, an integrated squared brush current value Ibrsh1 during temperature rise, a mass part filter constant Fmass1 during temperature rise, a coil filter constant Fcoil1 during temperature rise, a brush filter constant Fbrsh1 during temperature rise, an integrated squared mass part current value Imass2 during temperature fall, an integrated squared coil current value Icoil2 during temperature fall, an integrated squared brush current value Ibrsh2 during temperature fall, a mass part filter constant Fmass2 during temperature fall, a coil filter constant Fcoil2 during temperature fall, a brush filter constant Fbrsh2 during temperature fall, a mass part gain Gmass, a coil gain Gcoil, a brush gain Gbrsh, an estimated mass part rising temperature Tmass, an estimated coil rising temperature, Tcoil, and an estimated brush rising temperature Tbrsh. In Step S10, for example, '0' is set in the counter n.

After the completion of Step S10, the process progresses to Step S20, and then '1' is added to the counter n. In addition, while the ignition switch 9 is turned on, the processing from Step S20 to Step S54 shown in the flow chart is repeated. Whenever such processing is repeated, '1' is added to the counter n. After the completion of Step S20, the process progresses to Step S22, and then a detected current value output from the current detector 219 is acquired as a present motor current value Is. Next, the present motor current value Is is squared to obtain a squared motor current value Iss (Step S24). After the completion of Step S24, the process progresses to Step 26. In addition, the motor current value acquiring unit 380 shown in FIG. 8 is implemented by Step S22 and Step S24.

Figure 14:
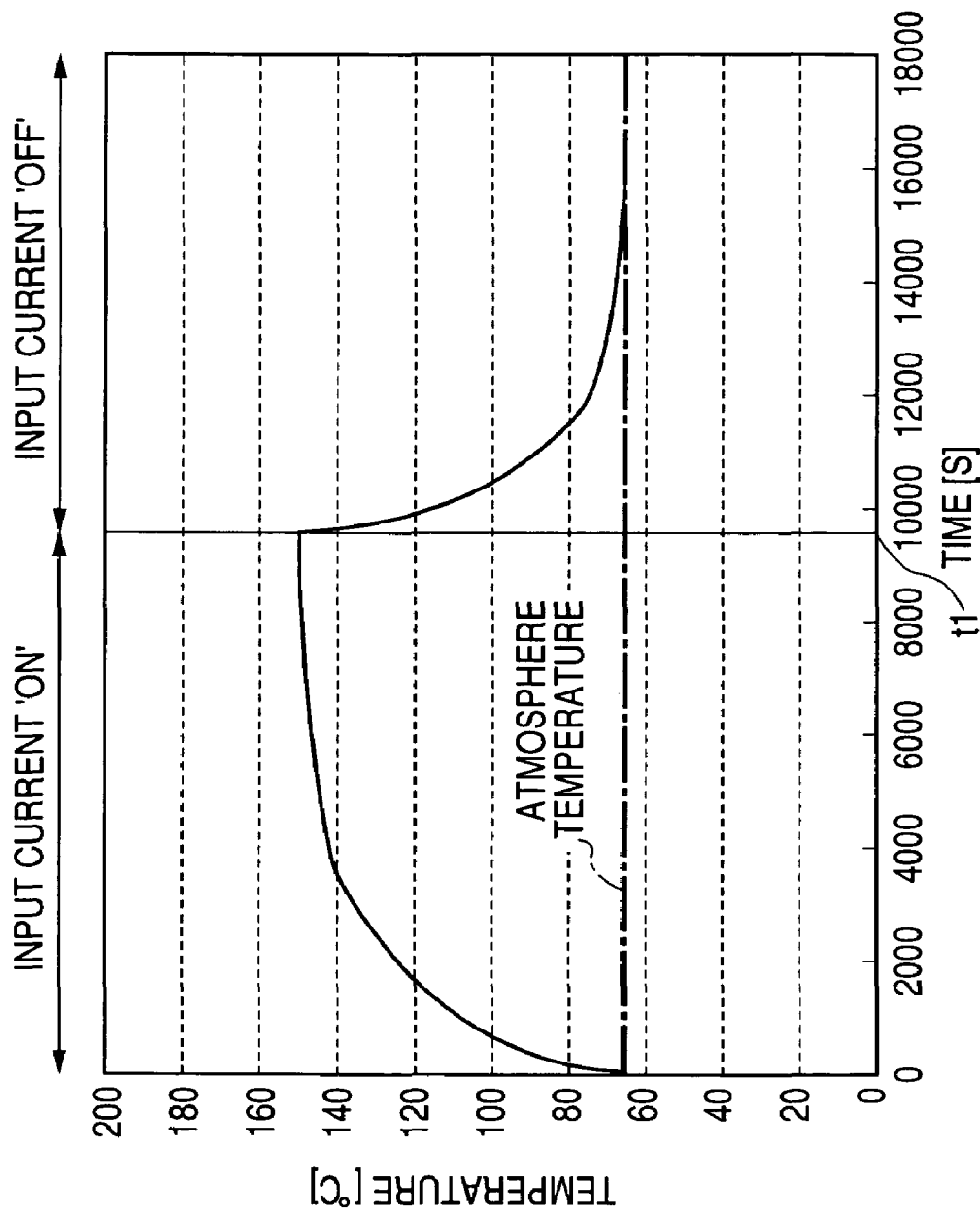
FIG. 14 is a graph showing temperature change characteristics of a motor brush.
Figure 15:
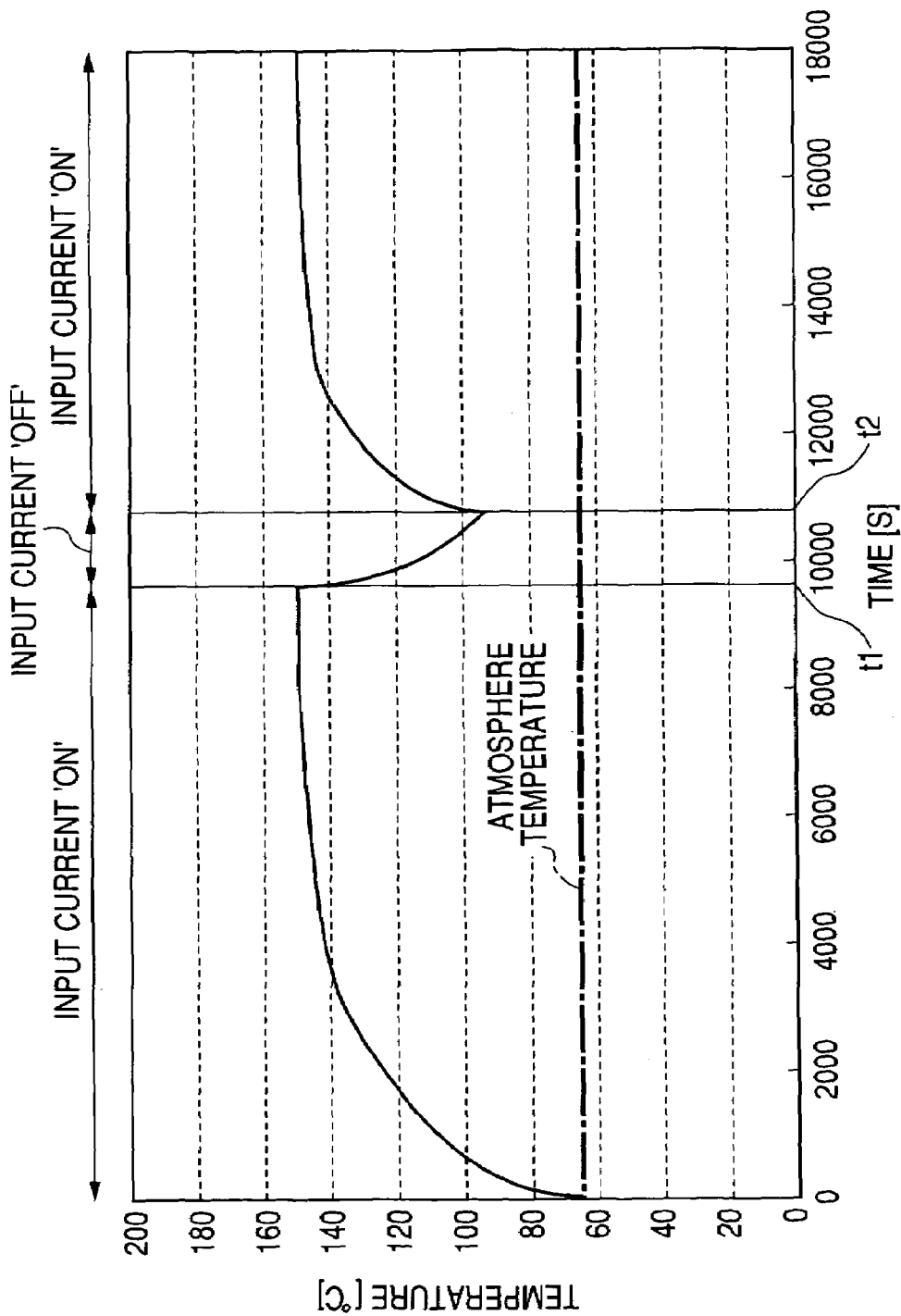
FIG. 15 is a graph showing another example of temperature change characteristics of a motor brush.

As shown in FIGS. 14 and 15, while the temperature is between an upper limit (a temperature at a point of time indicated by a symbol t1 in FIGS. 14 and 15) and a lower limit (an atmosphere temperature), the temperature rises when an input current is ON, and the temperature falls when an input current is OFF (the input current is zero). Accordingly, in the motor overheating preventing processing in the present embodiment, the processing (temperature estimating processing) for estimating the temperature of each portion is performed assuming that, if the present motor current value Is is larger than '0', the temperature is rising, and if the present motor current value Is is '0' the temperature is falling (it is assumed in the present embodiment that the motor current value does not become less than zero). Therefore, it is determined in Step S26 whether or not the present motor current value Is is '0', and then only the processing according to the determination result is performed. In addition, in order to determine whether the input current is cut off, actually, a sufficiently small positive value (a value close to '0') is sometime employed as a threshold. In the present invention, for the purpose of convenience, it is assumed that, only when the motor current value is '0', the input current is cut off).

From the determination result in Step S26, if the present motor current value Is is '0', the process progresses to Step S40, and if the present motor current value Is is not '0', the process progresses to Step S30. Then, in Step S30 (processing during temperature rise) and Step S40 (processing during temperature fall), the estimated temperatures of a mass part, a coil, and a brush within the motor 6 are calculated, respectively, in the following way. In addition, the temperature pattern determining unit (temperature pattern determining unit) 1820 shown in FIG. 8 is implemented by Step S26.

Figure 10:
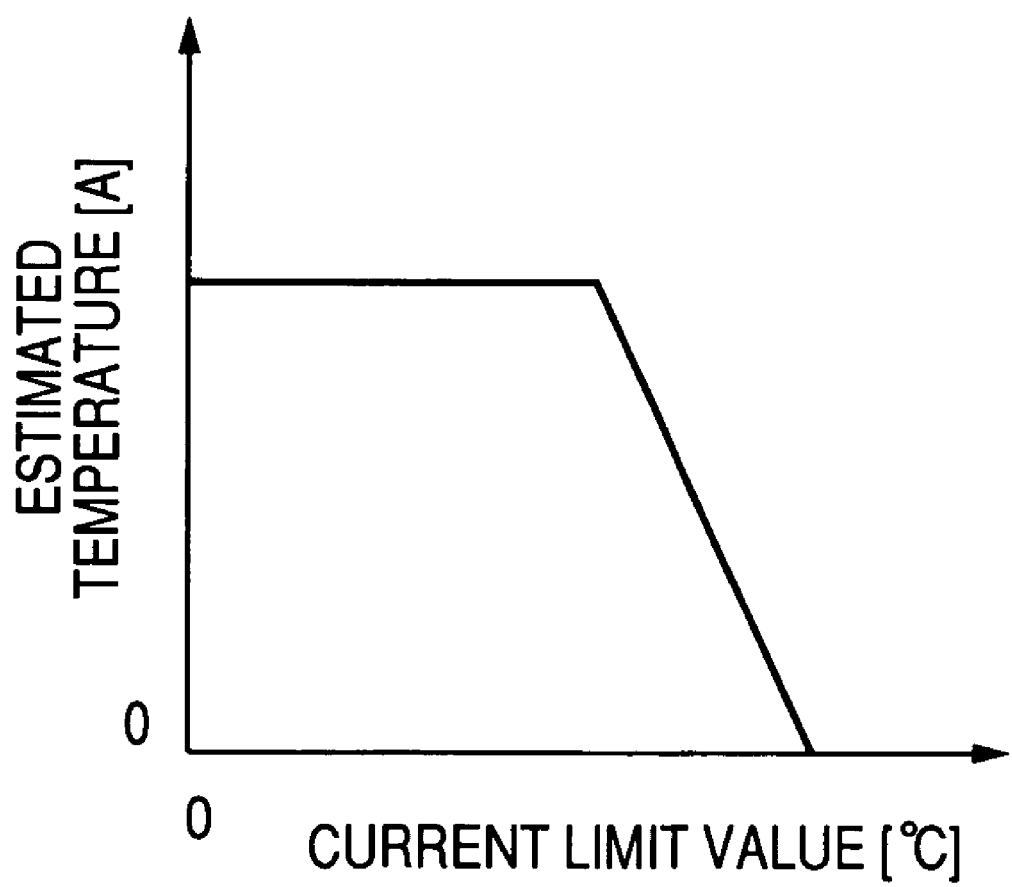
FIG. 10 is a map showing the correspondence between estimated temperatures and current limit values.

After the completion of Step S30 or Step S40, the process progresses to Step S50. In Step S50, the current limit value BLimit is calculated for each portion as an object to be prevented from overheating based on the estimated temperature Tp calculated by the temperature estimating processing. This processing will be described referring to FIG. 10. FIG. 10 shows the relationship between an estimated temperature and a current limit value of a certain portion of the motor 6 (referred to as an 'estimated temperature-current limit value correspondence map'). In FIG. 10, the estimated temperature means an estimated value of the temperature of the portion itself, and the current limit value means a maximum current value that does not break the portion even if a current having such a value is supplied thereto. As shown in FIG. 10, if the estimated value Tp becomes a predetermined temperature or more, the risk of overheating becomes higher. Thus, the current value (current limit value) BLimit which can be supplied to the motor reduces. Since such relationship between the estimated temperature Tp and the current limit value BLimit varies depending on the respective portions, the estimated temperature-current limit value correspondence map is prepared for each portion. In the present embodiment, since the mass part, the coil, and the brush are employed as the portions as the objects to be prevented from overheating, three estimated temperature-current limit value correspondence maps for obtaining a current limit value for the mass part, a current limit value for the coil, and a current limit value for the brush are prepared. By referring to the three estimated temperature-current limit value correspondence maps, the current limit value BLimit is obtained for each portion based on the estimated temperature Tp obtained in Step S30 or Step S40. In addition, the individual portion current limit value calculator 384 shown in FIG. 8 is implemented by Step S50. After the completion of Step S50, the process progresses to Step S52.

In Step S52, a minimum value is selected from the current limit values BLimit of the respective portions calculated in Step S50, and the minimum value is output as the current upper limit ILimit. For example, when a current limit value for the mass part, a current limit value for the coil, and a current limit value for the brush are calculated as 50 A, 30 A and 60 A, respectively, in Step S50, the minimum value 30 A among those current limit values is output as the current upper limit ILimit. In addition, the current upper limit output unit 386 shown in FIG. 8 is implemented by Step S52. After the completion of Step S52, the process progresses to Step 54, and then the present motor current value Is is set as the previous motor current value Ispre.

After the completion of Step S54, the process returns to Step S20, and then the above-described processing from Step S20 to Step S54 is repeated. In addition, in the present embodiment, the processing from Step S20 to Step 54 is repeated with a period of 80 milliseconds.

Next, referring to FIGS. 11 and 12, the operation of the processing during temperature rise (Step S30) and the processing during temperature fall (Step S40) will be described in detail. In addition, the state change determining unit (state change determining unit) 1822 shown in FIG. 8 is implemented by Step S300 shown in FIG. 6 and Step S400 shown in FIG. 12. Further, the calculation result transferring unit (calculation result transferring unit) 1824 shown in FIG. 8 is implemented by steps from Step S310 to Step S314 shown in FIG. 11 and steps from Step S410 to Step S414 shown in FIG. 12. Moreover, the calculator 1826 to be used during temperature rise (first calculator) shown in FIG. 8 is implemented by steps from Step S320 to S340 shown in FIG. 11, and the calculator 1828 to be used during temperature fall (second calculator) shown in FIG. 8 is implemented by steps from Step S420 to S440 shown in FIG. 12.

First, the operation of the processing during temperature rise (Step S30) will be described referring to FIG. 11. As previously mentioned, in the present embodiment, it is assumed that, when the motor current value is '0', the temperature is falling, and when the motor current value is larger than '0', the temperature is rising. Further, it is determined in Step S26 shown in FIG. 9 that the present motor current value Is is not '0', but is larger than '0'. Accordingly, if the previous motor current value Ispre is '0', the temperature change state from the point of time when the previous temperature estimating processing is performed to the point of time when the present temperature estimating processing is performed can be considered 'the temperature has changed from its falling state to its rising state'. On the other hand, if the previous current value Ispre is larger than '0', the temperature change state from the point of time when the previous temperature estimating processing is performed to the point of time when the present temperature estimating processing is performed can be considered 'the temperature continues to rise'. Therefore, it is determined in Step S300 whether the previous current value Ipres is '0', and only the processing according to the determination result is performed.

From the determination result in Step S300, if the previous current value Ispre is '0', the progress progresses to Step S310, and if the previous current value Ispre is not '0', the process progresses to Step S320.

In Step S310, a previous value Imass2 (n−1) of the integrated squared mass part current value during temperature fall is set as the integrated squared mass part current value (previous value) Imass1 (n−1) during temperature rise. Next, in Step S312, an integrated squared coil current value (previous value) Icoil2 (n−1) during temperature fall is set as (previous value) Icoil1 (n−1) of the integrated squared coil current value during temperature rise. Moreover, an integrated squared brush current value (previous value) Ibrsh2 (n−1) during temperature fall is set as the integrated squared brush current value (previous value) Ibrsh1 (n−1) during temperature rise. The processing from Step S310 to Step S314 is for reflecting the newest calculation result of an integrated squared current value of each portion calculated in processing during temperature fall on the calculating processing for estimating the temperature in the processing during temperature rise. After the completion of Step S314, the process progresses to Step S320.

In Step S320, an integrated squared mass part current value is calculated according to a predetermined calculating formula, and the calculated value is set as the integrated squared mass part current value (present value) Imass1 (n) during temperature rise. Specifically, a value calculated according to the calculating formula 'Imass1(n−1)+(Iss−Imass1(n−1))/Fmass1' is set as the integrated squared mass part current value (present value) Imass1 (n) during temperature rise. Here, Fmass1, Fcoil1 (to be described later), and Fbrsh1 are constants which give characteristics to estimated filters that are determined based on actually measured data during temperature rise, heat resistances, heat capacities, etc. in order to calculate the temperatures of the respective portions during temperature rise, and they are respectively a constant for the mass part, a constant for the coil, and a constant for the brush. Next, the integrated squared coil current value is calculated according to a predetermined calculating formula, and the calculated value is set as the integrated squared coil current value (present value) Icoil1 (n) during temperature rise (Step S322). Specifically, a value calculated according to the calculating formula 'Icoil1(n−1)+(Iss−Icoil1(n−1))/Fcoil1' is set as the integrated squared coil current value (present value) Icoil1 (n) during temperature rise. Moreover, the integrated squared brush current value is calculated according to a predetermined calculating formula, and the calculated value is set as the integrated squared brush current value (present value) Ibrsh1 (n) during temperature rise (Step S324). Specifically, a value calculated according to the calculating formula 'Ibrsh1 (n−1)+(Iss−Ibrsh1(n−1))/Fbrsh1' is set as the integrated squared brush current value (present value) Ibrsh1 (n) during temperature rise. After the completion of Step S324, the process progresses to Step 330.

In Step S330, an estimated rising temperature of the mass part of the motor 6 is calculated according to a predetermined calculating formula, and the calculated value is set as the estimated mass part rising temperature Tmass. Specifically, a value calculated according to the calculating formula 'Imass1 (n)×Gmass' is set as the estimated mass part rising temperature Tmass. Here, Gmass, Gcoil (to be described later) and Gbrsh are gains for calculating estimated rising temperatures of the respective portions, and they are respectively a gain for the mass part, a gain for the coil, and a gain for the brush. Next, the estimated rising temperature of the coil of the motor 6 is calculated according to a predetermined calculating formula, and the calculated value is set as the estimated coil rising temperature Tcoil (Step S332). Specifically, a value calculated according to the calculating formula 'Icoil1(n)×Gcoil1' is set as the estimated coil rising temperature Tcoil. Moreover, the rising temperature of the brush of the motor 6 is calculated according to a predetermined calculating formula, and the calculated value is set as the estimated brush rising temperature Tbrsh (Step S334). Specifically, a value calculated according to the calculating formula 'Imass1(n)×Gmass+Icoil1(n)×Gcoil+Ibrsh1(n)×Gbrsh1' is set as the estimated brush rising temperature Tbrsh. After the completion of Step S334, the progress progresses to Step S340.

In Step S340, the estimated temperature Tp is calculated for each portion based on the estimated rising temperature of each portion calculated in Step S330 through Step S334. For example, the estimated temperature Tp is calculated by adding the estimated rising temperature to the atmosphere temperature. Further, as described above, the present value of each of the integrated squared current values deflects the previous value of the integrated squared current value corresponding thereto. Therefore, the estimated temperature Tp of each portion is calculated in times series. When Step S340 is completed, the processing during temperature rise is finished and then the process progresses to Step S50 shown in FIG. 9.

Next, the operation of the processing during temperature fall (Step S40) will be described referring to FIG. 12. As previously described, in the present embodiment, it is considered that, when the motor current value is '0', the temperature is falling, and when the motor current value is larger than '0', the temperature is rising. Further, it is determined in Step S26 shown in FIG. 9 that the present motor current value Is is '0'. Accordingly, if the previous motor current value Ispre is '0', the temperature change state from the point of time when the previous temperature estimating processing is performed to the point of time when the present temperature estimating processing is performed can be considered 'the temperature falling state continues'. On the other hand, if the previous motor current value Ispre is larger than '0', the temperature change state from the point of time when the previous temperature estimating processing is performed to the point of time when the present temperature estimating processing is performed can be considered 'the temperature has changed from its rising state to its falling state'. Therefore, it is determined in Step S400 whether or not the previous motor current value Ispre is '0', and only the processing according to the determination result is performed.

From the determination result in Step S400, if the previous motor current value Ispre is '0', the process proceeds to Step S420, and if the previous motor current value Ispre is not '0', the process proceeds to Step S410.

In Step S410, a previous value Imass1 (n−1) of the integrated squared mass part current value during temperature rise is set as the integrated squared mass part current value (previous value) Imass2 (n−1) during temperature fall. Next, in Step S412, an integrated squared coil current value (previous value) Icoil1 (n−1) during temperature rise is set as the previous value Icoil2 (n−1) of the integrated squared coil current value during temperature fall. Moreover, in Step S414, an integrated squared brush current value (previous value) Ibrsh1 (n−1) during temperature rise is set as the integrated squared brush current value (previous value) Ibrsh2 (n−1) during temperature fall. The processing from Step S410 to Step S414 is for reflecting the newest calculation result of the integrated squared current value of each portion calculated in processing during temperature rise on the calculating processing for estimating the temperature in the processing during temperature fall. After the completion of Step S414, the process progresses to Step S420.

In Step S420, an integrated squared mass part current value is calculated according to a predetermined calculating formula, and the calculated value is set as the integrated squared mass part current value (present value) Imass2 (n) during temperature fall. Specifically, a value calculated according to the calculating formula 'Imass2(n−1)+(Iss−Imass2(n−1))/Fmass2' is set as the integrated squared mass part current value (present value) Imass2 (n) during temperature fall. Here, Fmass2, Fcoil2 (to be described later), and Fbrsh2 are constants which give characteristics to estimated filters that are determined based on actually measured data during temperature fall, heat resistances, heat capacities, etc. in order to calculate the temperatures of the respective portions during temperature fall, and they are respectively a constant for the mass part, a constant for the coil, and a constant for the brush. Next, an integrated squared coil current value is calculated according to a predetermined calculating formula, and the calculated value is set as the integrated squared coil current value (present value) Icoil2 (n) during temperature fall (Step S422). Specifically, a value calculated according to the calculating formula 'Icoil2(n−1)+(Iss−Icoil2(n−1))/Fcoil2' is set as the integrated squared coil current value (present value) Icoil2 (n) during temperature fall. Moreover, an integrated squared brush current value is calculated according to a predetermined calculating formula, and the calculated value is set as the integrated squared brush current value (present value) Ibrsh2 (n) during temperature fall (Step S424). Specifically, a value calculated according to the calculating formula 'Ibrsh2(n−1)+(Iss−Ibrsh2(n−1))/Fbrsh2' is set as the integrated squared brush current value (present value) Ibrsh2 (n) during temperature fall. After the completion of Step S424, the process progresses to Step 430.

In Step S430, an estimated rising temperature of the mass part of the motor 6 is calculated according to a predetermined calculating formula, and the calculated value is set as the estimated mass part rising temperature Tmass. Specifically, a value calculated according to the calculating formula 'Imass2 (n)×Gmass' is set as the estimated mass part rising temperature Tmass. Next, an estimated rising temperature of the coil of the motor 6 is calculated according to a predetermined calculating formula, and the calculated value is set as the estimated coil rising temperature Tcoil (Step S432). Specifically, a value calculated according to the calculating formula 'Icoil2 (n)×Gcoil' is set as the estimated coil rising temperature Tcoil. Moreover, the rising temperature of the brush of the motor 6 is calculated according to a predetermined calculating formula, and the calculated value is set as the estimated brush rising temperature Tbrsh (Step S434). Specifically, a value calculated according to the calculating formula 'Imass2(n)×Gmass+Icoil2(n)×Gcoil+Ibrsh2(n)×Gbrsh' is set as the estimated brush rising temperature Tbrsh. After the completion of Step S434, the progress progresses to Step S440.

In Step S440, the estimated temperature Tp is calculated for each portion based on the estimated rising temperature of each portion calculated in Step S430 through Step S434. For example, the estimated temperature Tp is calculated by adding the estimated rising temperature to the atmosphere temperature. Further, as described above, the present value of each of the integrated squared current values deflects the previous value of the integrated squared current value corresponding thereto. Therefore, the estimated temperature Tp of each portion is calculated in times series. When Step S440 is completed, the processing during temperature fall is finished, and then the process progresses to Step S50 shown in FIG. 9.

Figure 11:
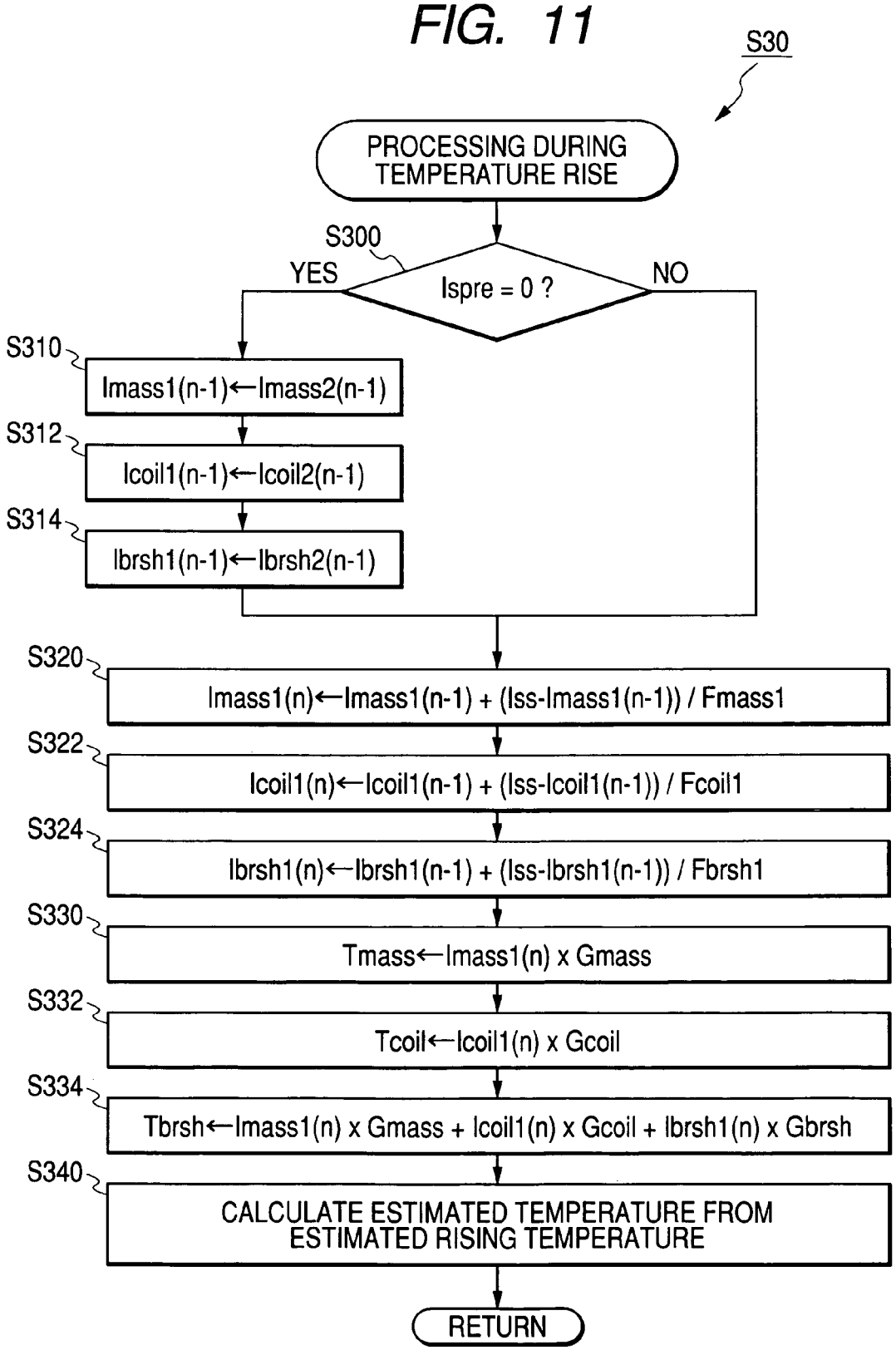
FIG. 11 is a flowchart showing the detailed procedure of processing during temperature rise in the embodiment.
Figure 12:
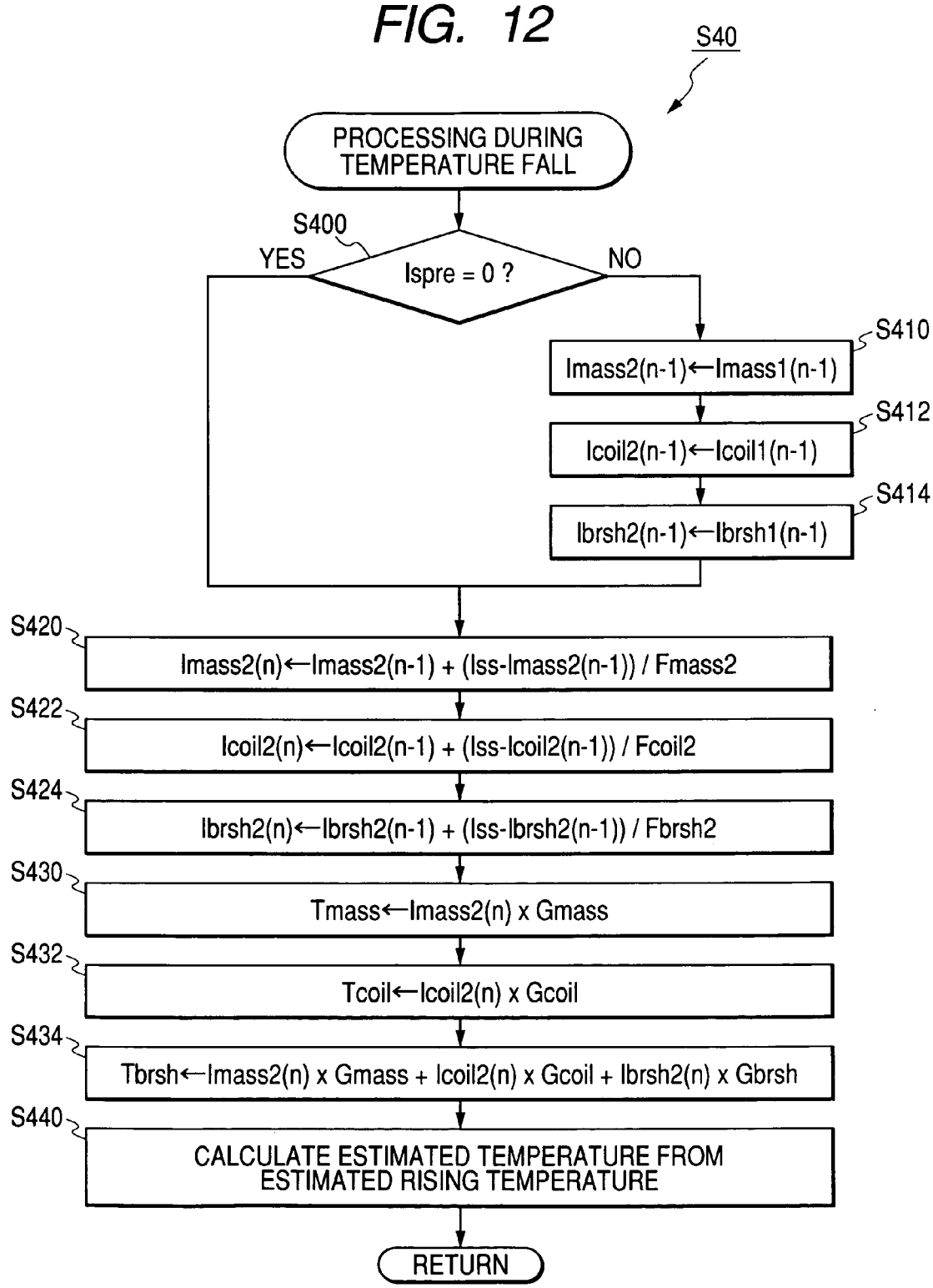
FIG. 12 is a flowchart showing the detailed procedure of processing during temperature fall in the embodiment.

Although the motor overheating preventing processing in the present embodiment has been described hitherto referring to FIGS. 8 to 12, as previously described, the functional structure shown in FIG. 8 is implemented by allowing the microcomputer to execute the respective steps shown in FIGS. 11 and 12.

Effects

As described above, in the electric power steering apparatus according to the present embodiment, the value of a current flowing to the motor is acquired with a predetermined period, and the temperature pattern determining unit determines a temperature change state of a portion as an object to be prevented from overheating based on the current value. When the temperature of the portion as an object to be prevented from overheating is rising, the temperature is estimated according to an calculating formula that is defined based on actually measured data during temperature rise, and when the temperature is falling, the temperature is estimated according to an calculating formula that is defined based on actually measured data during temperature fall. Further, when the temperature has changed from its rising state to its falling state, an integrated squared current value equivalent to a temperature rise amount (from the atmosphere temperature) that is calculated during temperature rise is reflected on the calculating processing during temperature fall, and when the temperature has changed from its falling state to its rising state, an integrated squared current value equivalent to a temperature fall amount (from the atmosphere temperature) that is calculated during temperature fall is reflected on the calculation processing during temperature rise. In the related art, since the temperature was estimated according to only the calculating formula that is defined based on actually measured data during temperature rise, an error occurred between an estimated temperature and an actual temperature. In the present embodiment, the above structure allows the temperature to be estimated according to a calculating formula that is defined based on actually measured data even when the temperature is rising or even when the temperature is falling. Therefore, even when the temperature of a portion as a temperature-estimated object does not fall down to the atmosphere temperature until an input current is again supplied after the input current is cut off as shown in FIG. 15 during temperature estimating processing, an error does not occur between an actual temperature and an estimated temperature. This enhances the precision of temperature estimation which in turn makes it possible to estimate the temperature of a portion as an object to be prevented from overheating with high precision. Also, the value of a current flowing to the motor can be limited based on the temperature of each portion that is estimated with high precision. As a result, it is possible to prevent a current from excessively flowing to the motor and thus to prevent parts from being damaged due to overheating.

<5. Modifications>

Figure 13:
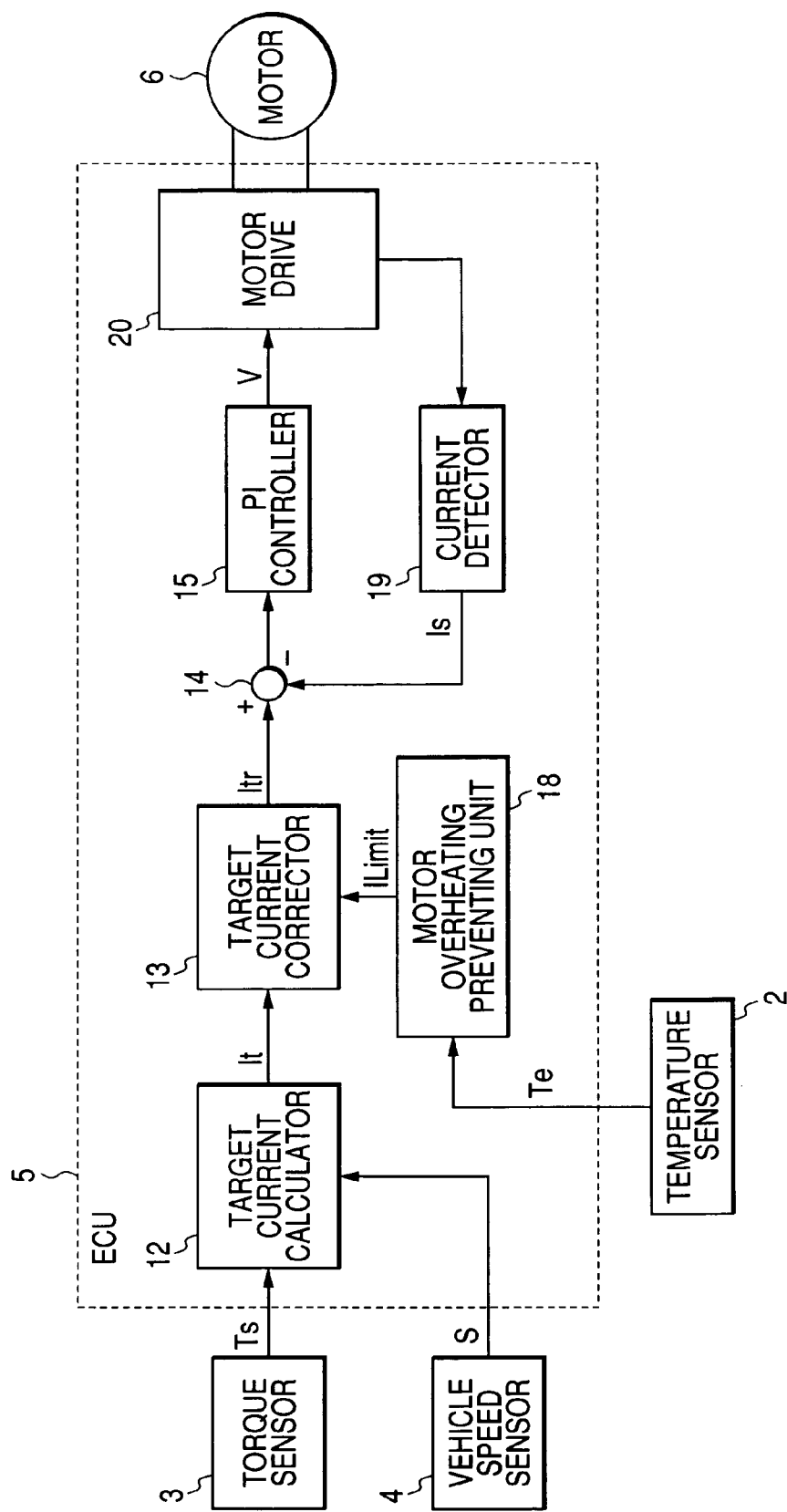
FIG. 13 is a block diagram showing the structure of the electric power steering apparatus according to a modification as seen from the viewpoint of control.

Although the temperature change state is determined based on the value of a current flowing to the motor in the present embodiment, the present invention is not limited thereto. FIG. 13 is a block diagram illustrating the structure of an electric power steering apparatus according to a modification as seen from the viewpoint of control. As shown in FIG. 13, a temperature sensor 2 may be provided in the vicinity of a portion as an object to be prevented from overheating, and the temperature change state may be determined based on a temperature Te detected by the temperature sensor 2.

Further, the respective calculating formulas described in the above embodiment are merely examples, and the present invention is not limited thereto. A calculating formula for estimating the temperature during temperature rise and a calculating formula for estimating the temperature during temperature fall may be provided, and when the temperature state has changed, a calculation result obtained according to one calculating formula before the change may be reflected on the calculation processing after the change. Moreover, an estimated temperature is calculated based on the same calculating formula during temperature rise and during temperature fall, but constants included in the calculating formula may be switched during temperature rise and during temperature fall.

Furthermore, although parts within the motor are exemplified as portions as objects to be prevented from overheating in the above embodiment, the present invention is not limited thereto. For example, the present invention can be applied in order to suppress overheating of parts within the ECU 5 and to prevent damage to the respective parts.

What is claimed is:

1. An electric power steering apparatus for applying a steering auxiliary force to a steering mechanism of a vehicle by driving an electric motor in response to an operation to steer the vehicle, the apparatus comprising:

first and second temperature calculators that calculate respective estimated temperature values of first and second protection objects which are portions to be protected from overheating due to heat generation caused by driving the electric motor;

a temperature detector disposed in the vicinity of the first protection object;

an atmosphere temperature calculator that calculates a first temperature variation that is a temperature rise amount in the temperature detector due to the heat generation and calculates an estimated atmosphere temperature value by subtracting the first temperature variation from a detected temperature value by the temperature detector; and a current limiter that limits a current to flow to the electric motor based on the estimated temperature values of the first and second protection objects, wherein the second temperature calculator calculates a second temperature variation that is a temperature rise amount of the second protection object by the heat generation, and calculates an estimated temperature value of the second protection object based on the second temperature variation and the estimated atmosphere temperature value.

2. The electric power steering apparatus according to claim 1, wherein the atmosphere temperature calculator calculates, as the first temperature variation, a temperature rise amount in the temperature detector due to the heat generation caused by the current flowing to the first protection object or its vicinity for driving the electric motor, and the second temperature calculator calculates, as the second temperature variation, a temperature rise amount of the second protection object due to the heat generation caused by the current flowing to the second protection object or its vicinity for driving the electric motor.

3. The electric power steering apparatus according to claim 1, wherein the first temperature calculator calculates a temperature rise amount of the first protection object due to the heat generation and calculates an estimated temperature value of the first protection object based on the temperature rise amount of the first protection object and the detected temperature value by the temperature detector.

4. An electric power steering apparatus for applying a steering auxiliary force to a steering mechanism of a vehicle by driving an electric motor based on a target value determined in response to an operation to steer a vehicle, the apparatus comprising:

a temperature detector disposed in the vicinity of a protection object which is a portion to be protected from overheating due to heat generation caused by driving the electric motor;

an atmosphere temperature calculator that calculates a first temperature variation that is a temperature rise amount in the temperature detector due to the heat generation and calculates an estimated atmosphere temperature value by subtracting the first temperature variation from a detected temperature value by the temperature detector;

a temperature compensation calculator that calculates a correction amount of the target value to be corrected in order to compensate a temperature characteristic of a predetermined portion based on the estimated atmosphere temperature value;

a target value corrector that corrects the target value in response to the correction amount;

a temperature calculator that calculates a second temperature variation that is a temperature rise amount of the protection object due to the heat generation and calculates an estimated temperature value of the protection object based on the second temperature variation and the estimated atmosphere temperature value or the detected temperature value; and a current limiter that limits a current to flow to the electric motor based on the estimated temperature value of the protection object.

5. An electric power steering apparatus for applying a steering auxiliary force to a steering mechanism of a vehicle by driving an electric motor in response to an operation to steer the vehicle, the apparatus comprising:

a temperature pattern determining unit that determines whether or not a temperature of a predetermined portion where heat is generated by a current flowing to the electric motor is rising or falling; and an estimated temperature calculator that repeatedly calculates estimated temperatures of the predetermined portion so that the estimated temperatures can be obtained in time series based on a calculation result obtained by executing calculation processing according to a calculating formula having predetermined constants, wherein the estimated temperature calculator calculates the respective estimated temperatures to constitute time series based on calculation results obtained by calculation processing according to the calculating formula including the estimated temperatures which constitute the time series and are already calculated, and wherein the estimated temperature calculator switches values of the constants according to the determination result of the temperature pattern determining unit so that the values of the constants when the temperature pattern determining unit determines that the temperature of the predetermined portion is rising are different from those of the constants when the temperature pattern determining unit determines that the temperature of the predetermined portion is falling.

6. The electric power steering apparatus according to claim 5, wherein the estimated temperatures of the predetermined portion are calculated based the value of a current flowing to the electric motor.

7. The electric power steering apparatus according to claim 5, wherein the temperature pattern determining unit determines whether the temperature of the predetermined portion is rising or falling based the value of a current flowing to the electric motor.

8. The electric power steering apparatus according to claim 1, further comprising a temperature sensor for detecting a temperature in the vicinity of the predetermined portion, wherein the temperature pattern determining unit determines whether the temperature is rising or falling based on the temperature detected by the temperature sensor.

9. An electric power steering apparatus for applying a steering auxiliary force to a steering mechanism of a vehicle by driving an electric motor in response to an operation to steer the vehicle, the apparatus comprising:

a temperature pattern determining unit that determines whether or not the temperature of a predetermined portion where heat is generated by a current flowing to the electric motor is in a rising state or in a falling state;

a state change determining unit that determines whether the temperature of the predetermined portion has changed from the rising state to the falling state or from the falling state to the rising state according to the determination result of the temperature pattern determining unit;

a first calculator to be used during the rising state, which calculates estimated temperatures of the predetermined portion in time series based on a first calculation result obtained by executing calculation processing according to a first calculating formula when the temperature pattern determining unit determines that the temperature of the predetermined portion is in the rising state;

a second calculator to be used during the falling state, which calculates estimated temperatures of the predetermined portion in time series based on a second calculation result obtained by executing calculation processing according to a second calculating formula when the temperature pattern determining unit determines that the temperature of the predetermined portion is in the falling state; and a calculation result transferring unit that performs transfer of the first calculation result and the second calculation result between the first calculator and the second calculator, wherein, in a case where the state change determining unit determines that the temperature of the predetermined portion has changed from the falling state to the rising state when estimated temperatures to constitute a time series composed of estimated temperatures to be repeatedly calculated based on the first or second calculation result are calculated, respectively, the first calculator calculates the respective estimated temperatures based on calculation results that are obtained when calculating immediately previously calculated estimated temperatures to constitute the time series, and that are obtained by calculation processing according to the first calculating formula including the second calculation result which are given to the first calculator from the second calculator by the calculation result transferring unit, and wherein, in a case where the state change determining unit determines that the temperature of the predetermined portion has changed from the rising state to the falling state when estimated temperatures to constitute the time series are calculated, respectively, the second calculator calculates the respective estimated temperatures based on calculation results that are obtained when calculating immediately previously calculated estimated temperatures to constitute the time series, and that are obtained by calculation processing according to the second calculating formula including the first calculation result which are given to the second calculator from the first calculator by the calculation result transferring unit.

10. The electric power steering apparatus according to claim 9, wherein the estimated temperatures of the predetermined portion are calculated based the value of a current flowing to the electric motor.

11. The electric power steering apparatus according to claim 9, wherein the temperature pattern determining unit determines whether the temperature of the predetermined portion is rising or falling based the value of a current flowing to the electric motor.

12. The electric power steering apparatus according to claims 9, further comprising a temperature sensor for detecting a temperature in the vicinity of the predetermined portion, wherein the temperature pattern determining unit determines whether the temperature is rising or falling based on the temperature detected by the temperature sensor.

* * * * *